US011245826B2

(12) United States Patent
Suzuki

(10) Patent No.: US 11,245,826 B2
(45) Date of Patent: Feb. 8, 2022

(54) COMMUNICATION BETWEEN IMAGING APPARATUS AND ACCESSORY APPARATUS

(71) Applicant: CANON KABUSHIKI KAISHA, Tokyo (JP)

(72) Inventor: Kazuto Suzuki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/837,124

(22) Filed: Apr. 1, 2020

(65) Prior Publication Data

US 2020/0322508 A1 Oct. 8, 2020

(30) Foreign Application Priority Data

Apr. 4, 2019 (JP) .............................. JP2019-072129

(51) Int. Cl.
*H04N 5/225* (2006.01)
*H04N 5/232* (2006.01)
*G03B 17/14* (2021.01)

(52) U.S. Cl.
CPC ........... *H04N 5/2254* (2013.01); *G03B 17/14* (2013.01); *H04N 5/23212* (2013.01); *H04N 5/23241* (2013.01)

(58) Field of Classification Search
None
See application file for complete search history.

(56) References Cited

U.S. PATENT DOCUMENTS

2011/0317061 A1 12/2011 Imafuji
2015/0116592 A1* 4/2015 Suzuki .................. H04N 5/232
348/375

FOREIGN PATENT DOCUMENTS

CN 105306812 A 2/2016
CN 107277311 A 10/2017
(Continued)

OTHER PUBLICATIONS

NXP Semiconductors. "NXP materials: I2C bus specification and user manual." UM10204. Rev. 6-4 Apr. 2014. pp. 1-64. Includes translation of NXP materials: I2C bus specification and user manual Rev5.0J-2-Oct. 9, 2012 [May 20, 2017 Internet search URL: http://www.nxp.com/documents/user_manual/UM10204_JA.pdf]. Cited in Specification.

(Continued)

*Primary Examiner* — Quan Pham
(74) *Attorney, Agent, or Firm* — Rossi, Kimms & McDowell LLP

(57) ABSTRACT

An imaging apparatus includes a camera communicator connected to a signal communication channel and a data communication channel, and a camera controller configured to perform a signal communication with the plurality of accessory apparatuses using the signal communication channel, and a first communication that is a data communication with the plurality of accessory apparatuses and a second communication that is a data communication with a first accessory apparatus among the plurality of accessory apparatuses, using the data communication channel. The camera controller notifies a second accessory apparatus other than the first accessory apparatus of a communication prohibition by the second communication, and then notifies a change of a clock rate of at least one of the first communication and the second communication via the second communication to change the clock rate.

8 Claims, 14 Drawing Sheets

(56) References Cited

FOREIGN PATENT DOCUMENTS

| | | |
|---|---|---|
| CN | 108989619 A | 12/2018 |
| JP | 2018205717 A | 12/2018 |

OTHER PUBLICATIONS

Office Action issued in Chinese Appln. No. 202010250513.3 dated Nov. 24, 2021. English translation provided.

* cited by examiner

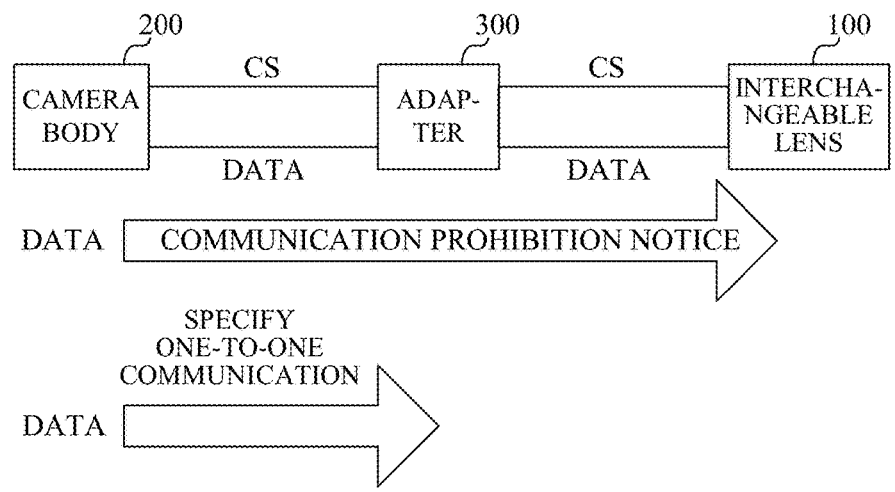
FIG. 12A
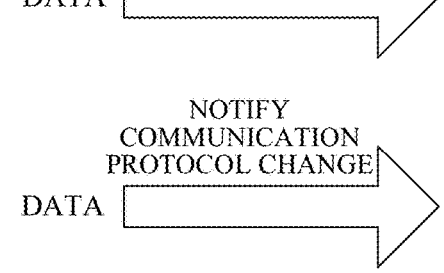
FIG. 12B
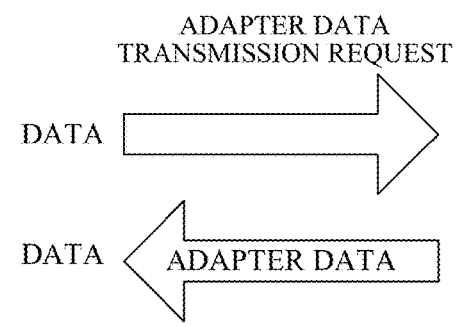
FIG. 12C
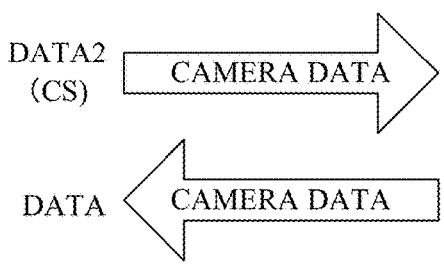
FIG. 12D
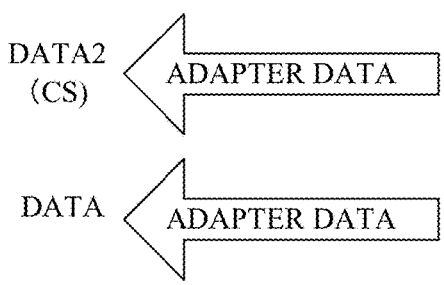

COMMUNICATION BETWEEN IMAGING APPARATUS AND ACCESSORY APPARATUS

BACKGROUND OF THE INVENTION

Field of the Invention

The present invention relates to an imaging (camera) system including an imaging apparatus (referred to as a camera body hereinafter) and an accessory apparatus such as an interchangeable lens and an adapter, which can communicate with each other, and a storage medium.

Description of the Related Art

In an interchangeable lens type camera system including a camera body to which an interchangeable lens is detachably attachable, a communication is performed for the camera body to control the operation of the interchangeable lens and for the interchangeable lens to provide the camera body with data necessary for its control and imaging. In particular, in imaging a recording use motion image and a live-view display use motion image with the interchangeable lens, a smooth lens control is required at an imaging cycle, so it is necessary to synchronize the imaging timing of the camera body and the control timing of the interchangeable lens with each other. Thus, the camera body needs to complete a data reception from the interchangeable lens and a transmission of a command, such as a variety of instructions and requests, to the interchangeable lens within the imaging cycle.

However, as a data amount received by the camera body from the interchangeable lens becomes larger or the imaging cycle becomes shorter (or the frame rate becomes higher), a communication of a large amount of data at higher speed is required.

An adapter such as a wide converter or a teleconverter (extender) may be connected between the camera body and the interchangeable lens, and this type of adapter also communicates with the camera body similar to the interchangeable lens. Hence, the camera system requires a communication system in which the camera body can perform a one-to-many communication with a plurality of accessory apparatuses including the interchangeable lens and the adapter. As a communication method for realizing the one-to-many communication between a communication master and a plurality of communication slaves, there is an FC communication method disclosed in NXP materials: I²C bus specification and user manual Rev5.0J-2-Oct. 9, 2012 [May 20, 2017 Internet search URL: http://www.nxp.com/documents/user_manual/UM10204_JA.pdf].

However, the one-to-many communication needs to use a communication protocol that allows communications between the camera body and a plurality of accessory apparatuses, which may have a low communication efficiency. Since the one-to-many communication must use a bit rate compatible with all of the camera body and the plurality of accessory apparatuses, a low bit rate may be used. When a large data amount is communicated between the camera body and the accessory apparatuses, it takes a long time to exchange data if a low-efficiency communication protocol or a low bit rate is used for the one-to-many communication.

SUMMARY OF THE INVENTION

The present invention provides an imaging apparatus, an accessory apparatus, and a storage medium, each of which can provide high-speed communications between the imaging apparatus and a plurality of accessory apparatuses.

An imaging apparatus according to one aspect of the present invention usable while connected to a plurality of accessory apparatuses includes a camera communicator connected to a signal communication channel used to transmit signals between the imaging apparatus and the plurality of accessory apparatuses and a data communication channel used for a data communication between the imaging apparatus and the plurality of accessory apparatuses, and a camera controller configured to perform a signal communication with the plurality of accessory apparatuses using the signal communication channel, and a first communication that is a data communication with the plurality of accessory apparatuses and a second communication that is a data communication with a first accessory apparatus among the plurality of accessory apparatuses, using the data communication channel. The camera controller notifies a second accessory apparatus other than the first accessory apparatus of a communication prohibition by the second communication, and then notifies a change of a clock rate of at least one of the first communication and the second communication via the second communication to change the clock rate. A storage medium storing a program that causes a computer to execute a control method of the above imaging apparatus also constitute another aspect of the present invention.

An accessory apparatus among a plurality of accessory apparatuses according to one aspect of the present invention, an imaging apparatus being usable while connected to the plurality of accessory apparatuses, includes an accessory communicator connected to a signal communication channel used to communicate a signal between the imaging apparatus and the plurality of accessory apparatuses, and a data communication channel used for a data communication between the accessory apparatus and the imaging apparatus, and an accessory controller configured to perform a signal communication with the imaging apparatus using the signal communication channel and to perform a data communication with the imaging apparatus using the data communication channel. The imaging apparatus can perform, as the data communication, a first communication with the plurality of accessory apparatuses and a second communication with a specific accessory apparatus among the plurality of accessory apparatuses. The accessory controller changes a clock rate when notified of a change of the clock rate of at least one of the first communication and the second communication from the imaging apparatus. A storage medium storing a program that causes a computer to execute a control method of the above accessory apparatus also constitute another aspect of the present invention.

Further features of the present invention will become apparent from the following description of exemplary embodiments with reference to the attached drawings.

BRIEF DESCRIPTION OF THE DRAWINGS

FIGS. 12A to 12D illustrate data communications after the communication protocol changing processing.

DESCRIPTION OF THE EMBODIMENTS

Referring now to the accompanying drawings, a description will be given of embodiments according to the present invention.

First Embodiment

Figure 1:
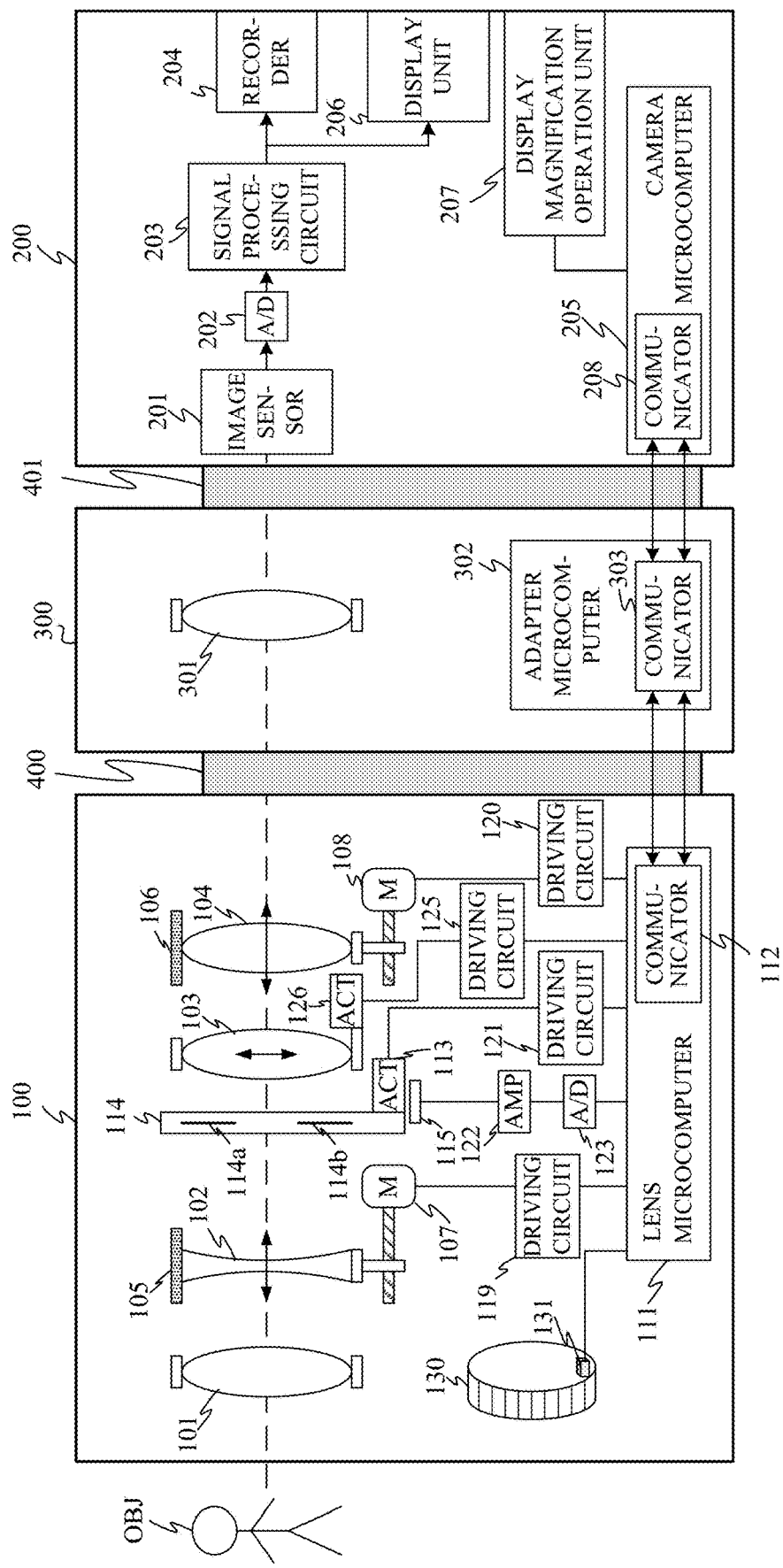
FIG. 1 is a block diagram showing a configuration of a camera system according to a first embodiment of the present invention.

FIG. 1 illustrates a configuration of an imaging system (referred to as a camera system hereinafter) according to a first embodiment of the present invention that includes an imaging apparatus (referred to as a camera body hereinafter) 200, and an interchangeable lens 100 and an intermediate adapter apparatus (simply referred to as an adapter hereinafter) 300 as accessory apparatuses. This embodiment illustrates the camera body 200 usable while the interchangeable lens 100 is connected via the adapter 300 (while a plurality of accessory apparatuses are connected).

While FIG. 1 illustrates an illustrative camera system in which a single adapter 300 is connected between the camera body 200 and the interchangeable lens 100, a plurality of adapters may be connected in series between the camera body 200 and the interchangeable lens 100.

The camera system according to this embodiment performs communications among the camera body 200, the interchangeable lens 100, and the adapter 300 using a plurality of communication methods. The camera body 200, the interchangeable lens 100, and the adapter 300 transmit control commands and data (information) through their respective communicators. In addition, each communicator supports a plurality of communication methods, and can select an optimal communication method in a variety of situations by switching to the common communication method in synchronization with each other according to the type of data to be communicated and the purpose of communication.

A description will now be given of a more specific configuration of the interchangeable lens 100, the camera body 200, and the adapter 300.

The interchangeable lens 100 and the adapter 300 are mechanically and electrically connected via a mount 400 as a coupling mechanism. Similarly, the adapter 300 and the camera body 200 are mechanically and electrically connected via a mount 401 as a coupling mechanism. The interchangeable lens 100 and the adapter 300 obtain the electric power from the camera body 200 through power supply terminal portions (not shown) provided to the mounts 400 and 401. Then, the power is suppled which is necessary for operations of a variety of actuators, a lens microcomputer 111, and an adapter microcomputer 302 as described later. The interchangeable lens 100, the camera body 200, and the adapter 300 communicate with each other through communication terminal portions (illustrated in FIG. 2) provided to the mounts 400 and 401.

The interchangeable lens 100 includes an imaging optical system. The imaging optical system includes, in order from an object OBJ side, a field lens 101, a magnification varying lens 102 that changes a magnification, a diaphragm unit 114 that adjusts a light amount. The imaging optical system further includes an image stabilization lens 103 configured to reduce (correct) an image blur, and a focus lens 104 used for focusing.

The zoom lens 102 and the focus lens 104 are held by lens holding frames 105 and 106, respectively. The lens holding frames 105 and 106 are movably guided in an optical axis direction (indicated by a broken line in the figure) by unillustrated guide shafts, and are driven in the optical axis direction by stepping motors 107 and 108. The stepping motors 107 and 108 move the zoom lens 102 and the focus lens 104 in synchronization with a driving pulse, respectively.

The image stabilization lens 103 shifts in a direction orthogonal to the optical axis in the imaging optical system to reduce image blurs caused by a camera shake such as a manual shake.

A lens microcomputer 111 serves as a lens controller (accessory controller) that controls the operation of each component in the interchangeable lens 100. The lens microcomputer 111 receives a control command and a transmission request command transmitted from the camera body 200 via a lens communicator (accessory communicator) 112 including a lens communication interface circuit. The lens microcomputer 111 performs a lens control corresponding to the control command, and transmits lens data corresponding to the transmission request command to the camera body 200 via the lens communicator 112.

The lens microcomputer 111 outputs a driving signal to a zoom driving circuit 119 and a focus driving circuit 120 in response to a command relating to a magnification variation and focusing among the control commands to drive the stepping motors 107 and 108. This configuration can provide zoom processing for controlling the magnification varying operation with the zoom lens 102 and AF (autofocus) processing for controlling the focusing operation with the focus lens 104.

The diaphragm unit 114 includes aperture blades 114a and 114b. The states (positions) of the aperture blades 114a and 114b are detected by a Hall element 115. The output from the Hall element 115 is input to the lens microcomputer 111 via an amplifier circuit 122 and an A/D conversion circuit 123. The lens microcomputer 111 outputs a driving signal to a diaphragm driving circuit 121 based on an input signal from the A/D conversion circuit 123 to drive a diaphragm actuator 113. Thereby, a light amount adjustment operation by the diaphragm unit 114 is controlled.

The lens microcomputer 111 controls an image stabilization actuator (voice coil motor etc.) 126 via an image stabilization driving circuit 125 in accordance with the camera shake detected by a shake sensor (not shown) such as a vibration gyro provided in the interchangeable lens 100. Thereby, the image stabilization processing for controlling the shift operation (image stabilization operation) of the image stabilization lens 103 is performed.

The interchangeable lens 100 includes a manual operation ring (simply referred to as an operation ring hereinafter) 130 and an operation ring detector 131. The operation ring detector 131 includes, for example, two photo-interrupters that output two-phase signals in accordance with a rotation of the operation ring 130. The lens microcomputer 111 can detect the rotational operation amount of the operation ring 130. The lens microcomputer 111 can notify the camera microcomputer 205 of the rotational operation amount of the operation ring 130 via the lens communicator 112.

The adapter 300 includes, for example, an extender for changing a focal length, and includes a magnification varying lens 301 and an adapter microcomputer 302. The adapter microcomputer 302 is an adapter controller (accessory controller) that controls the operation of each component in the adapter 300. The adapter microcomputer 302 receives a control command and a transmission request command transmitted from the camera body 200 via an adapter communicator (accessory communicator) 303 including a communication interface circuit. The adapter microcomputer 302 performs an adapter control corresponding to the control command, and transmits adapter data corresponding to the transmission request command to the camera body 200 via the adapter communicator 303.

The camera body 200 includes an image sensor 201, such as a CCD sensor or a CMOS sensor, an A/D conversion circuit 202, a signal processing circuit 203, a recorder 204, a camera microcomputer 205, and a display unit 206.

The image sensor 201 photoelectrically converts an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various types of image processing for the digital signal from the A/D conversion circuit 202 and generates an image signal. The signal processing circuit 203 also generates, from the image signal, focus information indicating a contrast state of an object image (focus state of the imaging optical system) and luminance information indicating an exposure state. The signal processing circuit 203 outputs the image signal to the display unit 206, and the display unit 206 displays the image signal as a live-view image used for a confirmation of a composition, a focus state, etc.

A camera microcomputer 205 as a camera controller controls the camera body 200 in accordance with an input from a camera operation member, such as an unillustrated imaging instructing switch and a variety of setting switches. The camera microcomputer 205 transmits a control command relating to the magnification varying operation of the zoom lens 102 to the lens microcomputer 111 in accordance with the operation of an unillustrated zoom switch via the camera communicator 208 including the communication interface circuit. Moreover, the camera microcomputer 205 transmits, to the lens microcomputer 111 via the camera communicator 208, a control command relating to the light amount adjustment operation of the diaphragm unit 114 in accordance with the luminance information and the focusing operation of the focus lens 104 in accordance with the focus information. The camera microcomputer 205 transmits a transmission request command for acquiring the control information and status information of the interchangeable lens 100 to the lens microcomputer 111, if necessary. Further, the camera microcomputer 205 transmits to the adapter microcomputer 302 a transmission request command for acquiring the control information and status information of the adapter 300.

Figure 2:
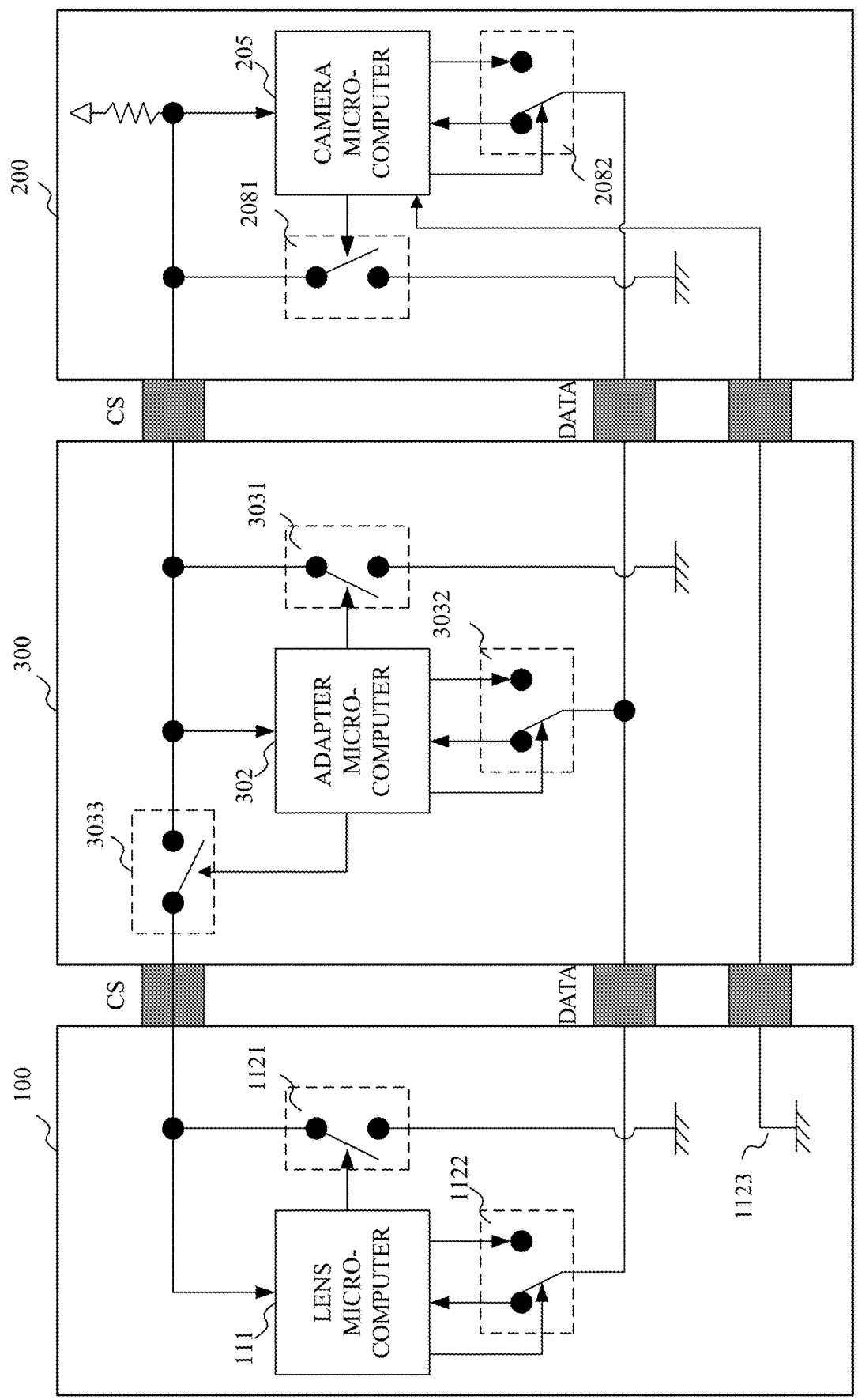
FIG. 2 is a diagram showing communication circuits of a camera body (camera microcomputer), an interchangeable lens (lens microcomputer), and an adapter (adapter microcomputer) according to the first embodiment.

Referring now to FIG. 2, a description will be given of a communication circuit configured among the camera body 200 (camera microcomputer 205), the interchangeable lens 100 (lens microcomputer 111), and the adapter 300 (adapter microcomputer 302). The camera microcomputer 205, the lens microcomputer 111, and the adapter microcomputer 302 achieve communications using signal lines connected via communication terminal portions provided on the mounts 400 and 401.

The signal lines include a signal line (first signal line corresponding to a signal transmission channel) CS that communicates a signal for a communication control, and a signal line (second signal corresponding to a data communication channel) DATA for a data communication.

The signal line CS is connected to the camera microcomputer 205, the adapter microcomputer 302, and the lens microcomputer 111. Therefore, the camera microcomputer 205, the adapter microcomputer 302, and the lens microcomputer 111 can detect high and low levels of the state of the signal line CS. The signal line CS is pulled up to an unillustrated power source in the camera body 200. The signal line CS can be connected to a ground GND (open drain connection) via a ground switch 1121 in the interchangeable lens 100, a ground switch 2081 in the camera body 200, and a ground switch 3031 in the adapter 300.

Due to this configuration, the camera microcomputer 205, the adapter microcomputer 302, and the lens microcomputer 111 can put the signal line CS into low by turning on (connecting) the ground switches 2081, 1121, and 3031, respectively. In addition, the camera microcomputer 205, the adapter microcomputer 302, and the lens microcomputer 111 can put the signal line CS into high by turning off (disconnect) the ground switches 2081, 1121, and 3031, respectively.

Furthermore, a CS switch (channel switch) 3033 is provided in the adapter 300. The adapter microcomputer 302 can connect and disconnect the signal line CS by switching the CS switch 3033 between the connected state and the disconnected state. In the disconnected state of the CS switch 3033, the signal output state from the camera body side (camera body 200 in this embodiment) of the adapter 300 to the signal line CS and the signal output state from the adapter 300 to the signal line CS are not transmitted to the interchangeable lens side (interchangeable lens 100 in this embodiment). In other words, the broadcast communication described later is unavailable from the adapter 300 to the communication slave on the interchangeable lens side.

A detailed description will be given later of a communication control signal (instruction or notification) transmitted through the signal line CS and its output processing.

The signal line DATA is a single-wire bidirectional data communication line that can be used by switching the data transmission direction. The signal line DATA is connectable to the lens microcomputer 111 via an input/output switch 1122 in the interchangeable lens 100, and connectable to the camera microcomputer 205 via an input/output switch 2082 in the camera body 200. The signal line DATA is connectable to the adapter microcomputer 302 via an input/output switch 3032 in the adapter 300. Each microcomputer includes a CMOS type data output part for transmitting data and a CMOS type data input part for receiving data (none of which is shown). Each microcomputer can select whether the signal line DATA is connected to the data output part or the data input part, by switching the input/output switch.

Each of the camera microcomputer 205, the adapter microcomputer 302, and the lens microcomputer 111 when transmitting data sets the input/output switch so as to connect the signal line DATA to the data output part. Each of the camera microcomputer 205, the adapter microcomputer 302, and the lens microcomputer 111 when receiving data sets an input/output switch so as to connect the signal line DATA to the data input part. Details of the input/output switching processing of the signal line DATA will be described later.

FIG. 2 illustrates an illustrative communication circuit, but another communication circuit may be used. For example, the signal line CS may be pulled down to GND in the camera body 200 and connected to an unillustrated power supply via the ground switch 1121 in the interchangeable lens 100, the ground switch 2081 in the camera body 200, and the ground switch 3031 in the adapter 300. In the interchangeable lens 100, the camera body 200, and the adapter 300, the signal line DATA may be always connected to the data input part, and the connection and disconnection between the signal line DATA and the data output part may be selected by a switch.

[Communication Data Format]

Figure 3:
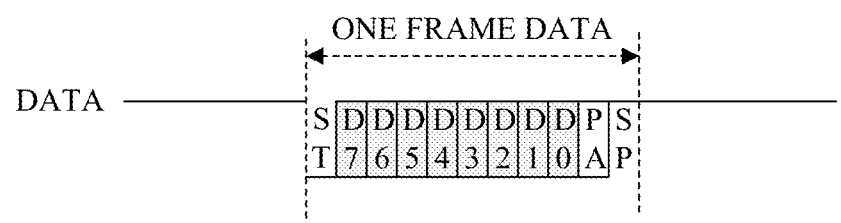
FIG. 3 is a diagram showing a communication format according to the first embodiment.

Referring now to FIG. 3, a description will be given of a format of communication data exchanged among the camera body 200 (camera microcomputer 205), the interchangeable lens 100 (lens microcomputer 111), and the adapter 300 (adapter microcomputer 302). This communication data format is common to the broadcast communication, which is a first communication described later, and the P2P communication, which is a second communication. A description will now be given of a communication data format in a so-called asynchronous communication in which a communication speed used for a communication among the microcomputers are previously determined and the transmission and reception are performed at a communication bit rate in accordance with the protocol.

Initially, in a non-transmission state that transmits no data, the signal level is maintained high. Next, in order to notify the data reception side of a start of the data transmission, the signal level is set to be low for one bit period. This one bit period will be referred to as a start bit ST. Next, one-byte data is transmitted for an eight-bit period from the next second bit to the ninth bit. The bit arrangement of the data starts with the most significant data D7 in the MSB first format, continues with data D6, data D5, . . . , Data D1, and ends with the least significant data D0. In the tenth bit, one-bit parity PA information is added, and one frame level starting from the start bit ST is completed by finally putting the signal level into high during a stop bit SP period indicating the end of the transmission data.

FIG. 3 illustrates an illustrative communication data format, but another communication data format may be used. For example, the bit arrangement of the data may be the LSB first or the nine-bit length, or no parity PA information need not be added. The communication data format may be switched between broadcast communication and the P2P communication.

[Broadcast Communication]

Next follows a description of the broadcast communication (first communication). The broadcast communication is the one-to-many communication in which one of the camera microcomputer 205, the lens microcomputer 111, and the adapter microcomputer 302 transmits data to the other two at the same time (i.e., simultaneous transmission). This broadcast communication is performed using the signal line CS and the signal line DATA. A communication mode in which the broadcast communication is performed is also referred to as a broadcast communication mode (first communication mode).

Figure 4:
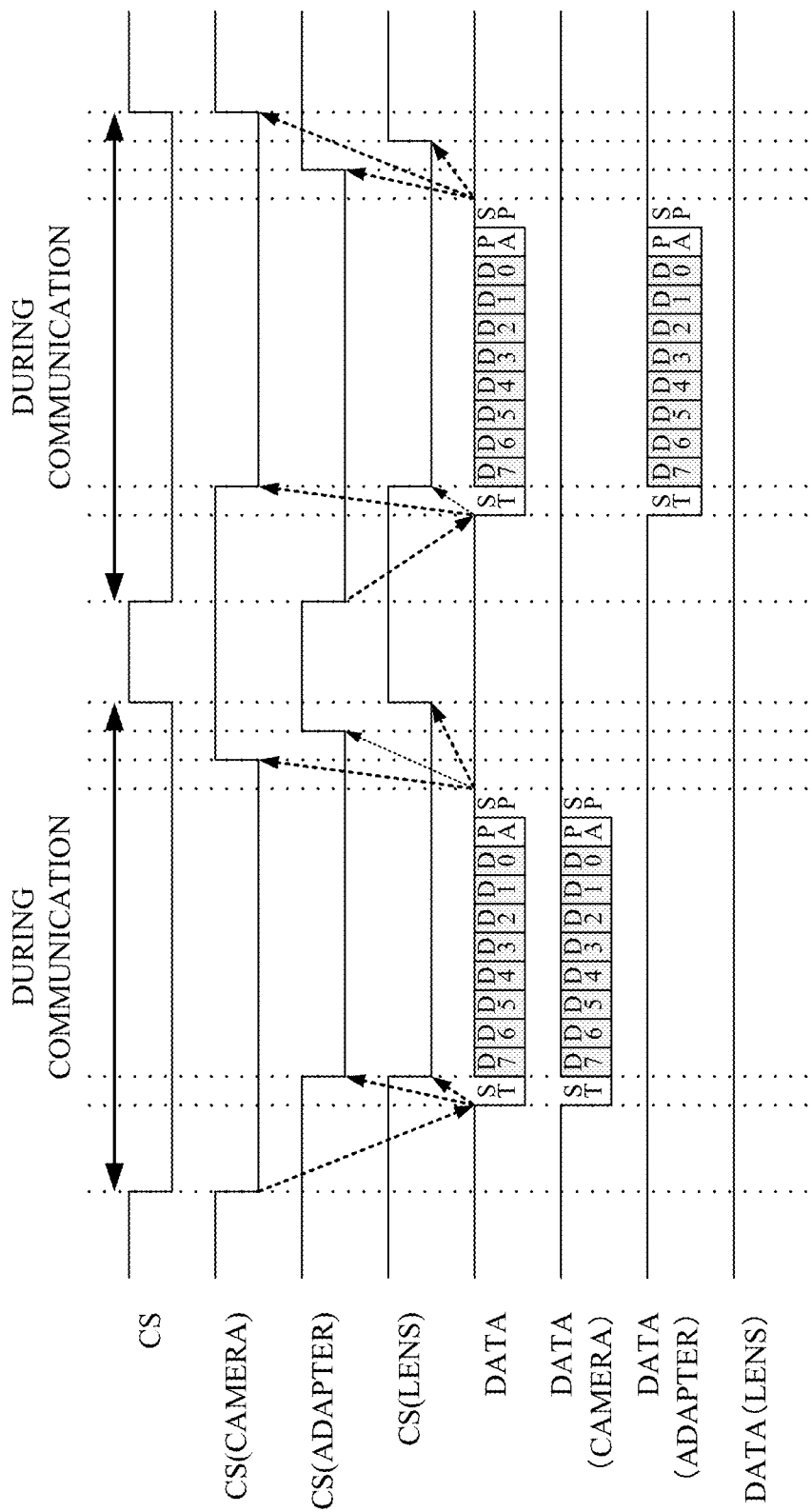
FIG. 4 is a diagram showing communication waveforms in a broadcast communication according to the first embodiment.

FIG. 4 illustrates signal waveforms in the broadcast communication among the camera microcomputer 205, the lens microcomputer 111, and the adapter microcomputer 302. Here is an example in which the adapter microcomputer 302 performs the broadcast communication to the camera microcomputer 205 and the lens microcomputer 111 in response to the broadcast communication from the camera microcomputer 205 to the lens microcomputer 111 and the adapter microcomputer 302.

Initially, the camera microcomputer 205 as a communication master starts the low output to the signal line CS in order to notify the lens microcomputer 111 and the adapter microcomputer 302 as communication slaves that the broadcast communication is to be started. Next, the camera microcomputer 205 outputs data to be transmitted, to the signal line DATA. On the other hand, the lens microcomputer 111 and the adapter microcomputer 302 start the low output to the signal line CS when detecting the start bit ST input from the signal line DATA. At this time, since the camera microcomputer 205 has already started the low output to the signal line CS, the signal level of the signal line CS does not change.

Thereafter, the camera microcomputer 205 stops the low output to the signal line CS after the stop bit SP is output. On the other hand, after receiving the stop bit SP input from the signal line DATA, the lens microcomputer 111 and the adapter microcomputer 302 analyze the received data and perform internal processing associated with the received data. When the preparation for receiving the next data is completed, the low output to the signal line CS is stopped. As described above, the signal level of the signal line CS becomes high when all of the camera microcomputer 205, the lens microcomputer 111, and the adapter microcomputer 302 stop the low output to the signal line CS. Thus, each of the camera microcomputer 205, the lens microcomputer 111, and the adapter microcomputer 302 can confirm that the signal level of the signal line CS becomes high after stopping the low output to the signal line CS. When each of the camera microcomputer 205, the lens microcomputer 111, and the adapter microcomputer 302 confirms that the signal level of the signal line CS has become high, it can determine that the current communication processing is completed and it is ready for the next communication.

Next, when confirming that the signal level of the signal line CS has returned to the high level, the adapter microcomputer 302 starts the low output to the signal line CS in order to notify the camera microcomputer 205 and the lens microcomputer 111 that the broadcast communication is to be started.

Next, the adapter microcomputer 302 outputs the data to be transmitted, to the signal line DATA. The camera microcomputer 205 and the lens microcomputer 111 start the low output to the signal line CS when detecting the start bit ST input from the signal line DATA. Since the adapter microcomputer 302 has already started the low output to the signal line CS at this time, the signal level propagated to the signal line CS does not change. Thereafter, the adapter microcomputer 302 stops the low output to the signal line CS when it completes outputting the stop bit SP. On the other hand, after receiving up to the stop bit SP input from the signal line DATA, the camera microcomputer 205 and the lens microcomputer 111 analyze the received data and perform internal processing associated with the received data. Then, after the preparation for receiving the next data is completed, the low output to the signal line CS is stopped.

As described above, the signal transmitted through the signal line CS in the broadcast communication serves as a signal indicating the start (execution) and the ongoing execution of the broadcast communication.

FIG. 4 illustrates an illustrative broadcast communication, but another broadcast communication may be performed. For example, the data transmitted in a single broadcast communication may be one-byte data as illustrated in FIG. 4, but may be two-byte or three-byte data. The broadcast communication may be a one-way communication from the camera microcomputer 205 serving as a communication master to the lens microcomputer 111 and adapter microcomputer 302 serving as communication slaves.

[P2P Communication]

Next follows a description of the P2P communication performed among the camera body 200 (camera microcomputer 205), the interchangeable lens 100 (lens microcomputer 111), and the adapter 300 (adapter microcomputer 302). The P2P communication is a one-to-one communication (individual communication) in which the camera body 200 as the communication master designates (selects) a single communication counterpart (first specific accessory apparatus) among the interchangeable lens 100 and the adapter 300 as the communication slaves, and communicates data with only the designated communication slave. This P2P communication is also performed using the signal line CS and the signal line DATA. A communication mode in which the P2P communication is performed will be also referred to as a P2P communication mode (second communication mode).

Figure 5:
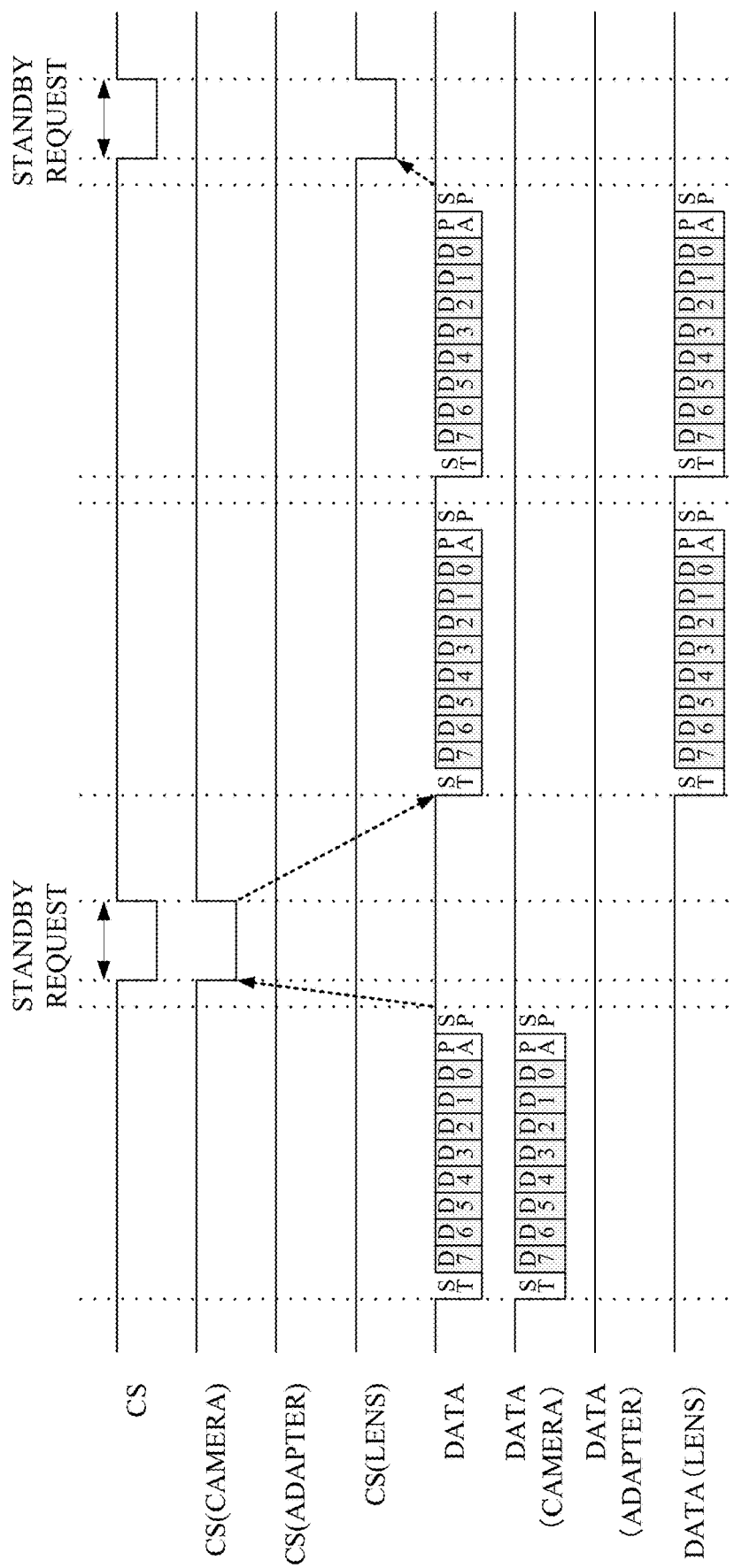
FIG. 5 is a diagram showing communication waveforms in a P2P communication according to the first embodiment.

FIG. 5 illustrates, in an example, signal waveforms of the P2P communication exchanged between the camera microcomputer 205 and the lens microcomputer (first accessory apparatus) 111 designated as the communication counterpart. In response to one-byte data transmission from the camera microcomputer 205, the lens microcomputer 111 transmits two-byte data to the camera microcomputer 205. Communication mode switching processing (between the broadcast communication mode and the P2P communication mode) and processing for designating the communication counterpart in the P2P communication will be described later.

Initially, the camera microcomputer 205 as the communication master outputs data to be transmitted to the lens microcomputer 111, to the signal line DATA. The camera microcomputer 205 starts the low output (standby request) to the signal line CS after completing the output of the stop bit SP. After the camera microcomputer 205 is ready to receive the next data, the camera microcomputer 205 stops the low output to the signal line CS. On the other hand, after detecting the low signal input from the signal line CS, the lens microcomputer 111 analyzes the received data input from the signal line DATA and performs internal processing associated with the received data. Thereafter, when confirming that the signal level of the signal line CS has returned to the high level, the lens microcomputer 111 continuously outputs two-byte data to be transmitted, to the signal line DATA.

The lens microcomputer 111 starts the low output to the signal line CS after completing the output of the stop bit SP of the second byte. Thereafter, when becoming ready to receive the next data, the lens microcomputer 111 stops the low output to the signal line CS. The adapter microcomputer 302 that is not designated as the communication counterpart for the P2P communication does not output the signal to the signal line CS or the signal line DATA.

As described above, the signal transmitted through the signal line CS in the P2P communication serves as a notification signal indicating the end of the data transmission and a standby request for the next data transmission.

While FIG. 5 illustrates the illustrative P2P communication, another P2P communication may be used. For example, data may be transmitted every one byte at a time using the signal line DATA, or data may be transmitted every three bytes or more.

[Communication Mode Switching Processing and Communication Counterpart Designating Processing]

Figure 6:
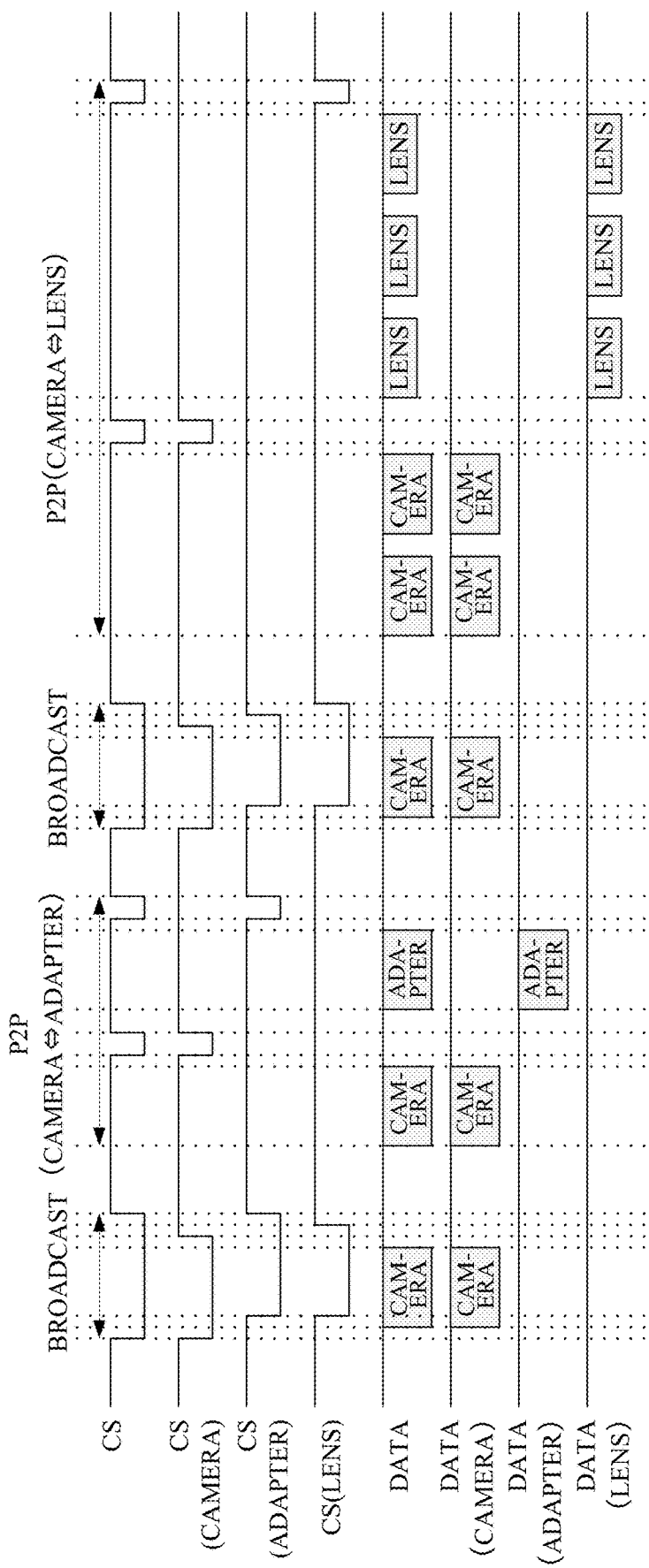
FIG. 6 is a diagram showing communication waveforms when the communication mode is switched in the first embodiment.

Referring now to FIG. 6, a description will be given of the communication mode switching processing and the communication counterpart designating processing in the P2P communication. FIG. 6 illustrates signal waveforms during the communication mode switching and communication counterpart designating, which are exchanged among the camera microcomputer 205, the lens microcomputer 111, and the adapter microcomputer 302. The communication counterpart of the P2P communication is designated by the broadcast communication. In this illustrative description, the adapter microcomputer 302 is designated as the communication counterpart of the P2P communication by the camera microcomputer 205, and one-byte data P2P communication from the camera microcomputer 205 and one-byte data P2P communication from the adapter microcomputer 302 are executed. Thereafter, the lens microcomputer 111 is designated as the communication counterpart of the P2P communication by the camera microcomputer 205, and two-byte data P2P communication from the camera microcomputer 205 and three-byte data P2P communication from the lens microcomputer 111 are executed.

Initially, the camera microcomputer 205 which is the communication master executes the broadcast communication according to the procedure described in FIG. 4. What is notified by this broadcast communication is slave designation data for designating the communication counterpart with the camera microcomputer 205 in the next P2P communication. The lens microcomputer 111 and the adapter microcomputer 302, which are the communication slaves at this time, determine whether or not they are designated as the communication counterpart in the P2P communication based on the slave designation data received by the broadcast communication. This determination result switches the communication modes of the camera microcomputer 205 and the designated communication slave (first accessory apparatus) from the broadcast communication mode to the P2P communication mode. Since the adapter microcomputer 302 is designated herein as the communication counterpart in the next P2P communication, data is transmitted and received between the camera microcomputer 205 and the adapter microcomputer 302 in accordance with the procedure described in FIG. 5. Herein, one-byte data is transmitted from the camera microcomputer 205 to the adapter microcomputer 302, and then one-byte data is transmitted from the adapter microcomputer 302 to the camera microcomputer 205.

When the P2P communication ends between the camera microcomputer 205 and the adapter microcomputer 302, the camera microcomputer 205 can again designate a communication counterpart for the P2P communication by the broadcast communication. Herein, in order to designate the lens microcomputer 111 as the communication counterpart for the next P2P communication, the lens microcomputer 111 is set to the slave designation data, and the broadcast communication is executed according to the procedure described in FIG. 4. In response to this broadcast communication, the adapter microcomputer 302 ends the P2P communication, and at the same time, the communication modes of the camera microcomputer 205 and the lens microcomputer 111 are switched to the P2P communication mode. If no broadcast communication is executed at this stage, the P2P communication continues between the camera microcomputer 205 and the adapter microcomputer 302.

In the next P2P communication, data is transmitted and received between the camera microcomputer 205 and the lens microcomputer 111 in accordance with the procedure described in FIG. 5. Herein, the camera microcomputer 205 transmits two-byte data to the lens microcomputer 111, and then the lens microcomputer 111 transmits three-byte data to the camera microcomputer 205.

As described above, the broadcast communication can designate the communication counterpart for the P2P communication, and at the same time, and the broadcast communication and the P2P communication can be switched.

[Communication Control Processing]

Figure 7A:
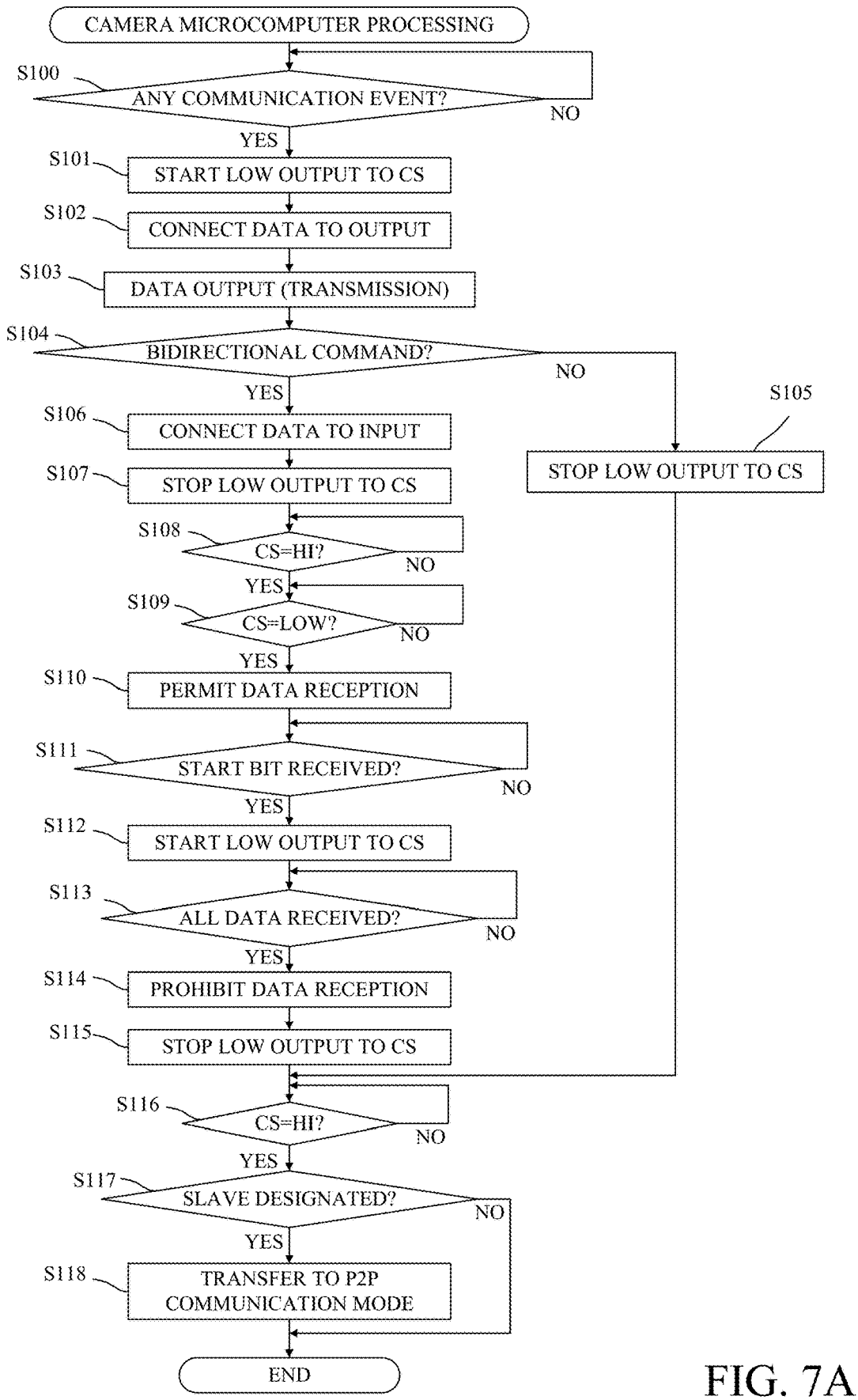
FIG. 7A is a flowchart illustrating processing of the camera body in the broadcast communication according to the first embodiment.
Figure 7B:
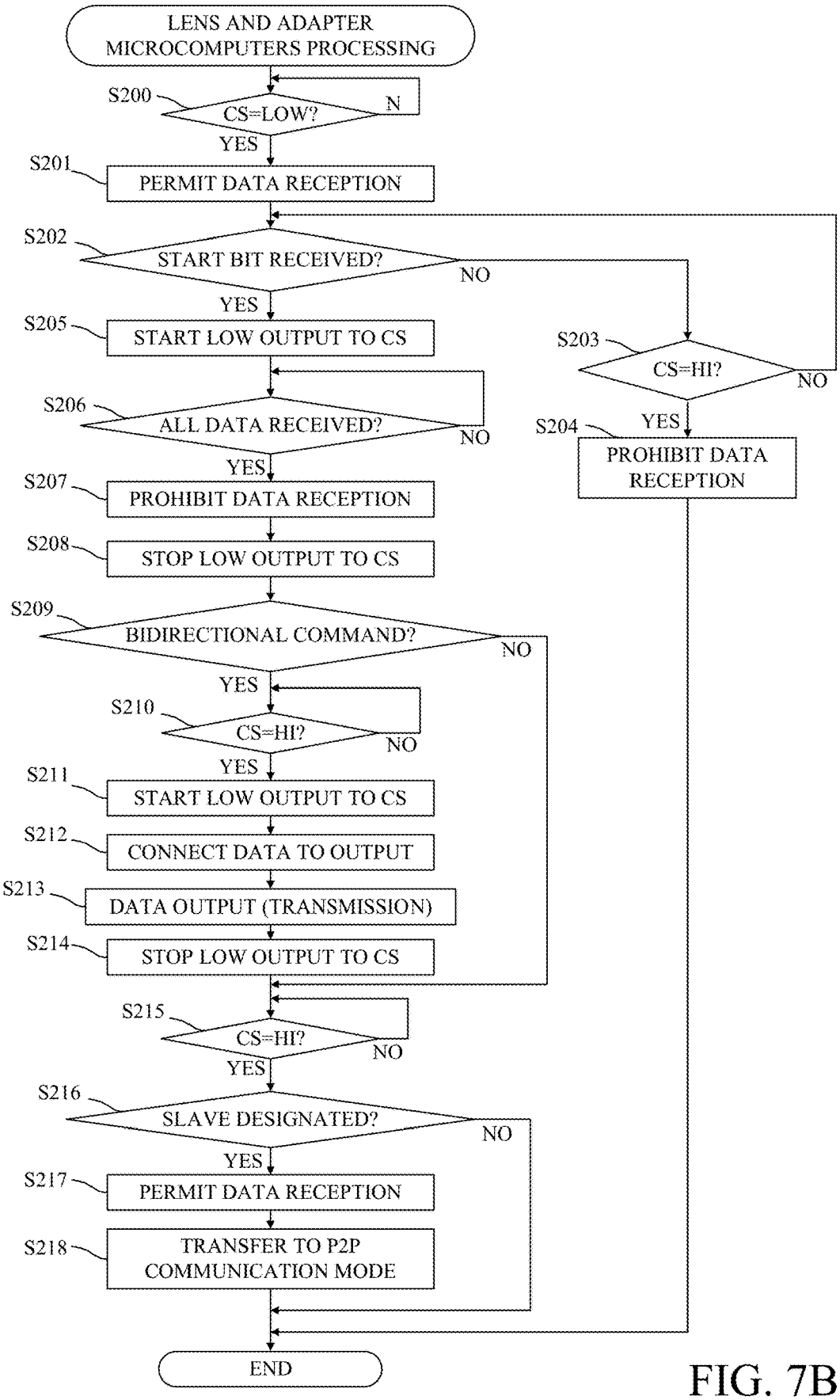
FIG. 7B is a flowchart showing processing of the interchangeable lens and the adapter in the broadcast communication according to the first embodiment.

A description will now be given of communication control processing performed among the camera microcomputer 205, the lens microcomputer 111, and the adapter microcomputer 302. Referring now to the flowchart in FIGS. 7A and 7B, a description will be given of processing in the broadcast communication mode. FIG. 7A illustrates processing performed by the camera microcomputer 205, and FIG. 7B illustrates processing performed by the lens microcomputer 111 and the adapter microcomputer 302. Each of the camera microcomputer 205, the lens microcomputer 111, and the adapter microcomputer 302, each of which includes the computer, executes this processing and other processing described later in accordance with a communication control program as a computer program.

When an event for starting the broadcast communication occurs in the step S100, the camera microcomputer 205 turns on (connects) the ground switch 2081 to put the signal line CS into low in the step S101. Thereby, the start of the broadcast communication is notified to the lens microcomputer 111 and the adapter microcomputer 302. The lens microcomputer 111 and the adapter microcomputer 302 that have detected the low level of the signal line CS in the step S200 permit the data reception from the signal line DATA in the step S201.

Next, the camera microcomputer 205 operates the input/output switch 2082 in the step S102 to connect the signal line DATA to the data output part, and performs the data transmission in the step S103. When detecting the start bit of the signal line DATA in the step S202, the lens microcomputer 111 and the adapter microcomputer 302 turns on (connects) the lens switch 1121 and the ground switch 3031 so as to indicate the ongoing communication processing in the step S205. Thereby, the low output to the signal line CS starts. Thereafter, when determining that all data has been received in the step S206, the lens microcomputer 111 and the adapter microcomputer 302 prohibit the data reception from the signal line DATA in the step S207. Further, in the step S208, the ground switch 1121 and the ground switch 3031 are turned off (disconnected) to indicate that the communication processing has ended, and the low output to the signal line CS is stopped. Herein, the number of bytes of data to be transmitted and received is not limited, as long as the camera microcomputer 205, the lens microcomputer 111, and the adapter microcomputer 302 has common recognitions.

Next, in the step S104, the camera microcomputer 205 determines whether the data transmitted in the step S103 is a bidirectional command including the transmission from the lens microcomputer 111 or the adapter microcomputer 302. If data is not the bidirectional command, the camera microcomputer 205 turns off (disconnects) the ground switch 2081 in the step S105 to stop the low output to the signal line CS, and proceeds to the step S116. If it is the bidirectional command, the camera microcomputer 205 operates the input/output switch 2082 in the step S106 to connect the signal line DATA to the data input part. In the step S107, the ground switch 2081 is turned off (disconnects) to stop the low output to the signal line CS, and it waits for the signal line CS to become high in the step S108.

On the other hand, in the step S209, the lens microcomputer 111 and the adapter microcomputer 302 determine whether the data received in the step S206 is the bidirectional command including the transmission from itself. If the data is not the bidirectional command, the lens microcomputer 111 and the adapter microcomputer 302 proceed to the step S215, and if the data is the bidirectional command, the lens microcomputer 111 and the adapter microcomputer 302 wait for the signal line CS to become high in the step S210. When the signal line CS becomes high, the lens microcomputer 111 and the adapter microcomputer 302 notify the start of the broadcast communication by turning on (connecting) the ground switches 1121 and 3031 and by putting the signal line CS into low in the step S211. When detecting the low level of the signal line CS in the step S109, the camera microcomputer 205 permits the data reception from the signal line DATA in the step S110.

Next, the lens microcomputer 111 and the adapter microcomputer 302 operate the input/output switches 1122 and 3032 in the step S212 to connect the signal line DATA to the data output part, and perform the data transmission in the step S213. When detecting the start bit of the signal line DATA in the step S111, the camera microcomputer 205 turns on (connects) the ground switch 2081 to indicate ongoing communication processing in the step S112. Thereby, the low output to the signal line CS starts. The lens microcomputer 111 and the adapter microcomputer 302 stop the low output to the signal line CS by turning off (shut off) the ground switches 1121 and 3031 in the step S214 after the transmissions of all data are completed.

If the camera microcomputer 205 determines that all data has been received in the step S113, it prohibits the data reception from the signal line DATA in the step S114. In the step S115, the camera microcomputer 205 turns off (disconnects) the ground switch 2081 to stop the low output to the signal line CS in order to indicate that the communication processing has ended. Herein, the number of bytes of data to be transmitted and received is not limited, as long as the camera microcomputer 205, the lens microcomputer 111, and the adapter microcomputer 302 have common recognitions.

Next, the camera microcomputer 205 waits for the signal line CS to become high in the step S116. When the signal line CS becomes high, the camera microcomputer 205 determines in the step S117 whether or not the lens microcomputer 111 or the adapter microcomputer 302 has been designated as a communication counterpart for the P2P communication based on the data transmitted in the step S103. If none of the lens microcomputer 111 and the adapter microcomputer 302 are designated as the communication counterparts, the camera microcomputer 205 ends the processing as it is, and if any is designated, the camera microcomputer 205 transfers to the P2P communication mode in the step S118.

On the other hand, the lens microcomputer 111 and the adapter microcomputer 302 stand by until the signal line CS becomes high in the step S215. When the signal line CS becomes high, in the step S216, the lens microcomputer 111 and the adapter microcomputer 302 determine whether or not they are designated as the communication counterpart for the P2P communication by the camera microcomputer 205, based on the data received in the step S206. If none of the lens microcomputer 111 and the adapter microcomputer 302 are designated as the communication counterparts, the processing ends. If it is designated as the communication counterpart, the designated microcomputer out of the lens microcomputer 111 and the adapter microcomputer 302 permits the data reception from the signal line DATA in the step S217, and transfers to the P2P communication mode in the step S218.

If the start bit is not detected in the step S202, the lens microcomputer 111 and the adapter microcomputer 302 confirm whether or not the signal line CS has become high in the step S203. When the signal line CS becomes high (returns to the high level), the lens microcomputer 111 and the adapter microcomputer 302 prohibit the data reception from the signal line DATA in the step S204 and end the processing. This is processing for a communication slave not designated as a communication counterpart for the P2P communication to respond to the low output to the signal line CS by the P2P communication between the camera microcomputer 205 and another communication slave.

Figure 8A:
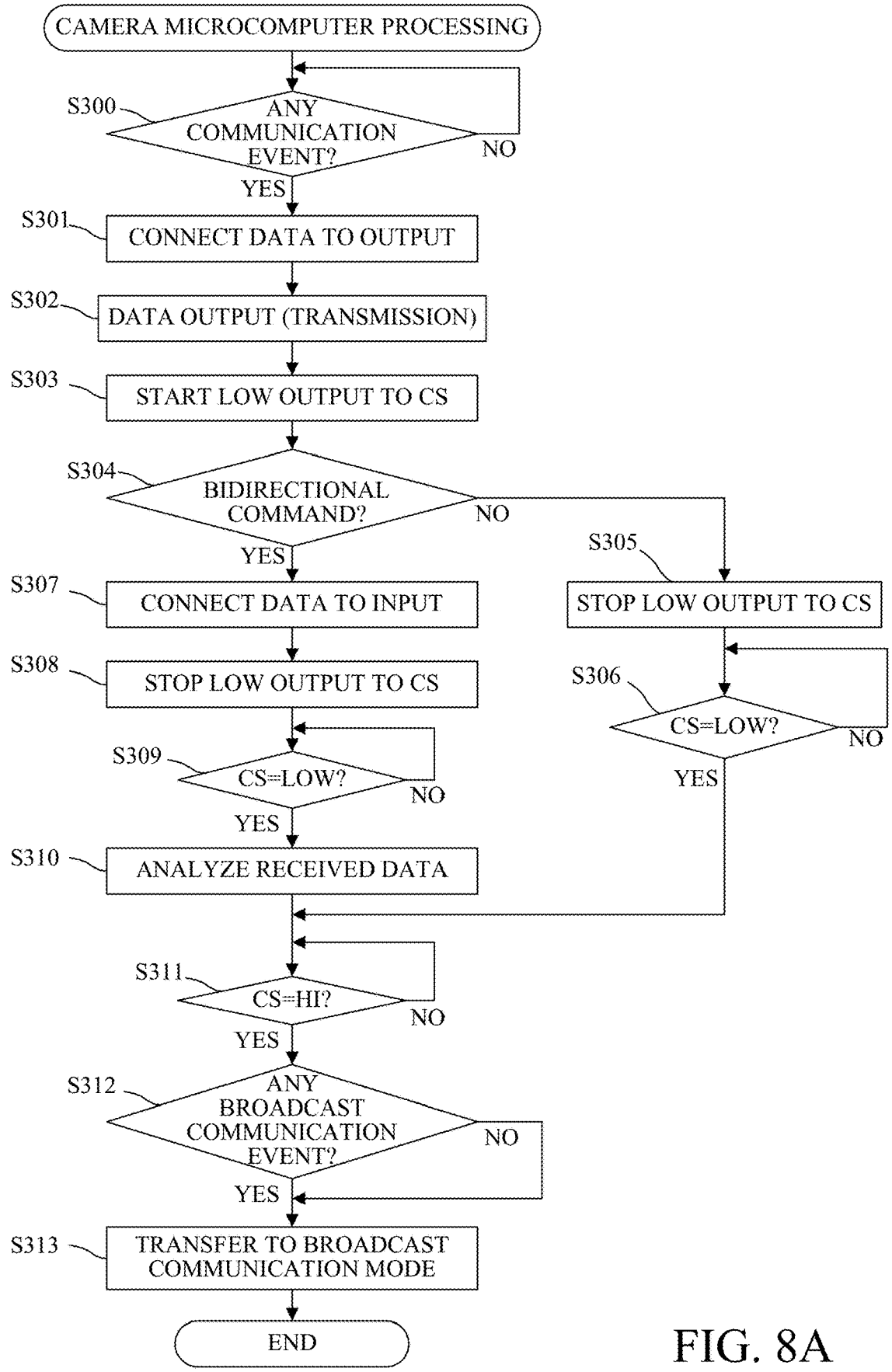
FIG. 8A is a flowchart illustrating processing of the camera body in the P2P communication according to the first embodiment.
Figure 8B:
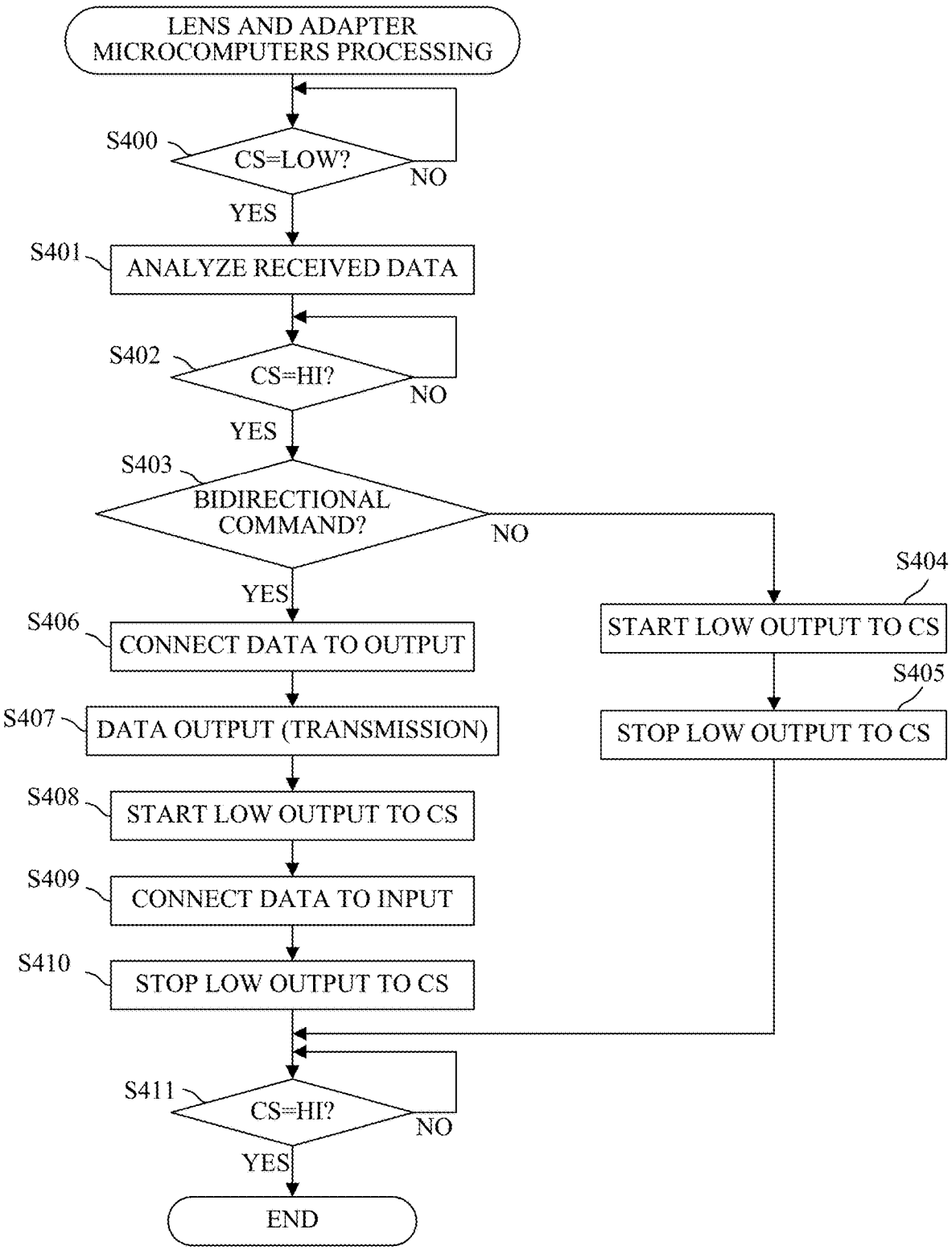
FIG. 8B is a flowchart illustrating processing of the interchangeable lens and the adapter in the P2P communication according to the first embodiment.

Referring now to flowcharts in FIGS. 8A and 8B, a description will be given of processing in the P2P communication mode. FIG. 8A illustrates processing performed by the camera microcomputer 205, and FIG. 8B illustrates processing performed by a microcomputer (referred to as a specific microcomputer hereinafter) designated as a communication counterpart for the P2P communication among the lens microcomputer 111 and the adapter microcomputer 302.

When an event for starting the P2P communication occurs in the step S300, the camera microcomputer 205 operates the input/output switch 2082 in the step S301 to connect the signal line DATA to the data output part, and performs the data transmission in the step S302. Thereafter, when all data transmissions are completed, the camera microcomputer 205 turns on (connects) the ground switch 2081 in the step S303 and starts the low output to the signal line CS. On the other hand, when the specific microcomputer detects the low level of the signal line CS in the step S400, it determines that the data transmission from the camera microcomputer 205 is completed, and analyzes the data received from the signal line DATA in the step S401.

Next, in the step S304, the camera microcomputer 205 determines whether the data transmitted in the step S302 is the bidirectional command including the transmission from the specific microcomputer. If it is not the bidirectional command, the camera microcomputer 205 turns off (disconnects) the ground switch 2081 in the step S305 to stop the low output to the signal line CS. In the step S306, it waits for the signal line CS to become high before proceeding to the step S311. If the data is the bidirectional command, the camera microcomputer 205 operates the input/output switch 2082 in the step S307 to connect the signal line DATA to the data input part. In the step S308, the ground switch 2081 is turned off (disconnected) to stop the low output to the signal line CS.

On the other hand, after waiting for the high level of the signal line CS in the step S402, the specific microcomputer determines in the step S403 whether the data received in the step S401 is the bidirectional command including the transmission from itself. If it is not the bidirectional command, the specific microcomputer turns on (connects) and turns off (disconnects) the ground switch (1121 or 3031) in the steps S404 and S405. Thereby, the low output to the signal line CS is started and stopped, and the flow proceeds to the step S411. In the bidirectional command, the specific microcomputer operates the input/output switch (1122 or 3032) in the step S406 to connect the signal line DATA to the data output part, and performs the data transmission in the step S407. Thereafter, when all data transmissions are completed, the specific microcomputer starts the low output to the signal line CS by turning on (connecting) the ground switch (1121 or 3031) in the step S408.

Next, when detecting the low level in the signal line CS in the step S309, the camera microcomputer 205 determines in the step S310 that the data transmission from the specific microcomputer has been completed, and analyzes the data received from the signal line DATA. On the other hand, in the step S409, the specific microcomputer operates the input/output switch (1122 or 3032) to connect the signal line DATA to the data input part. Thereafter, the specific microcomputer turns off (disconnects) the ground switch (1121 or 3031) in the step S410 to stop the low output to the signal line CS.

Next, the camera microcomputer 205 waits for the signal line CS to become high in the step S311. Thereafter, when an event for starting the broadcast communication occurs in the step S312, the camera microcomputer 205 transfers to the broadcast communication mode in the step S313. On the other hand, the specific microcomputer waits for the signal line CS to become high in the step S411 and ends the processing.

Thus, this embodiment properly switches the meaning (function) of the signal transmitted through the signal line CS between the broadcast communication and the P2P communication. Thereby, the camera microcomputer 205, the lens microcomputer 111, and the adapter microcomputer 302 can communicate with one another with the small number of signal lines (or channels).

[Authentication Communication Processing]

Figure 9:
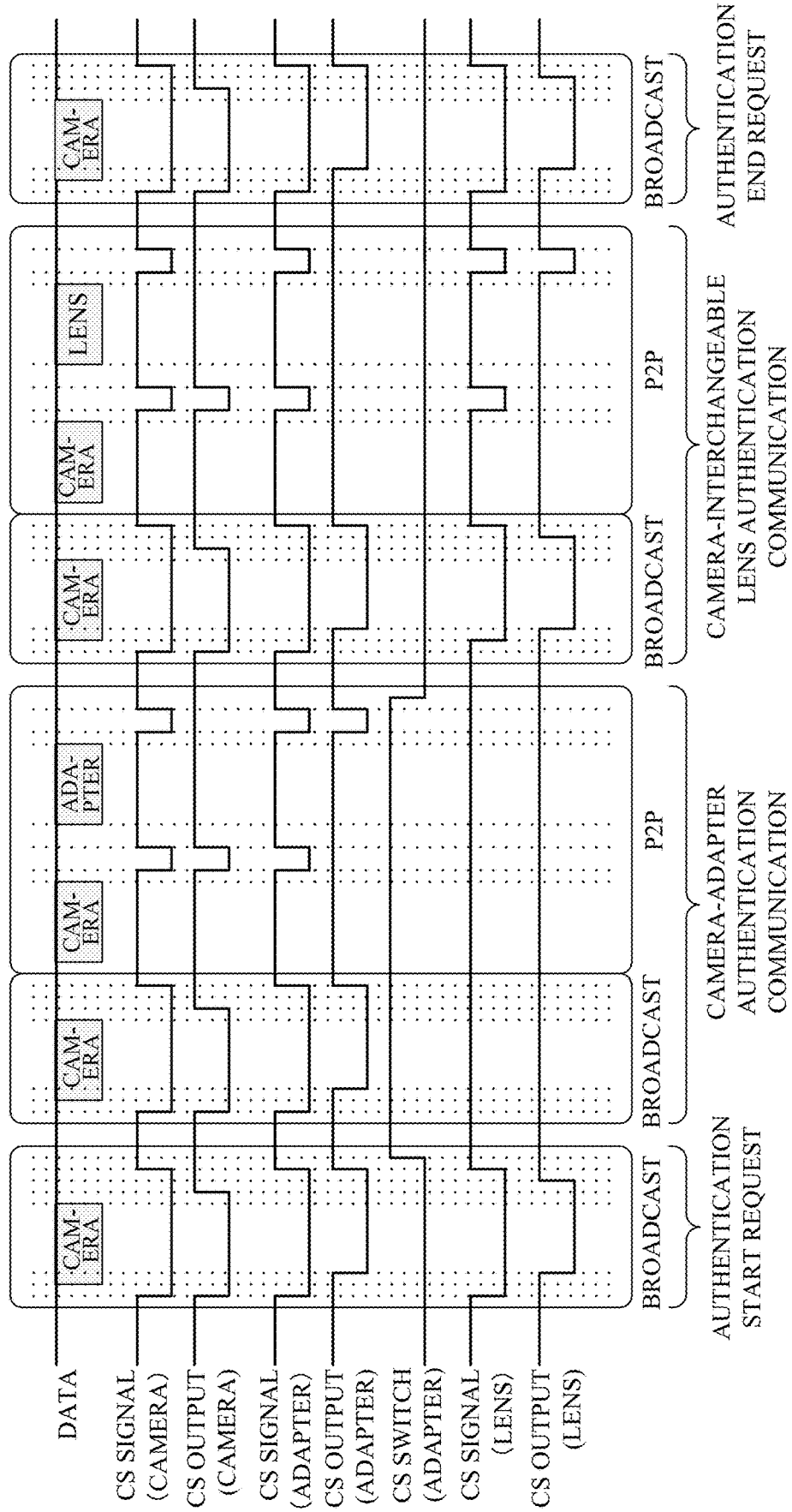
FIG. 9 is a diagram showing communication waveforms in authentication communication processing according to the first embodiment.
Figure 10:
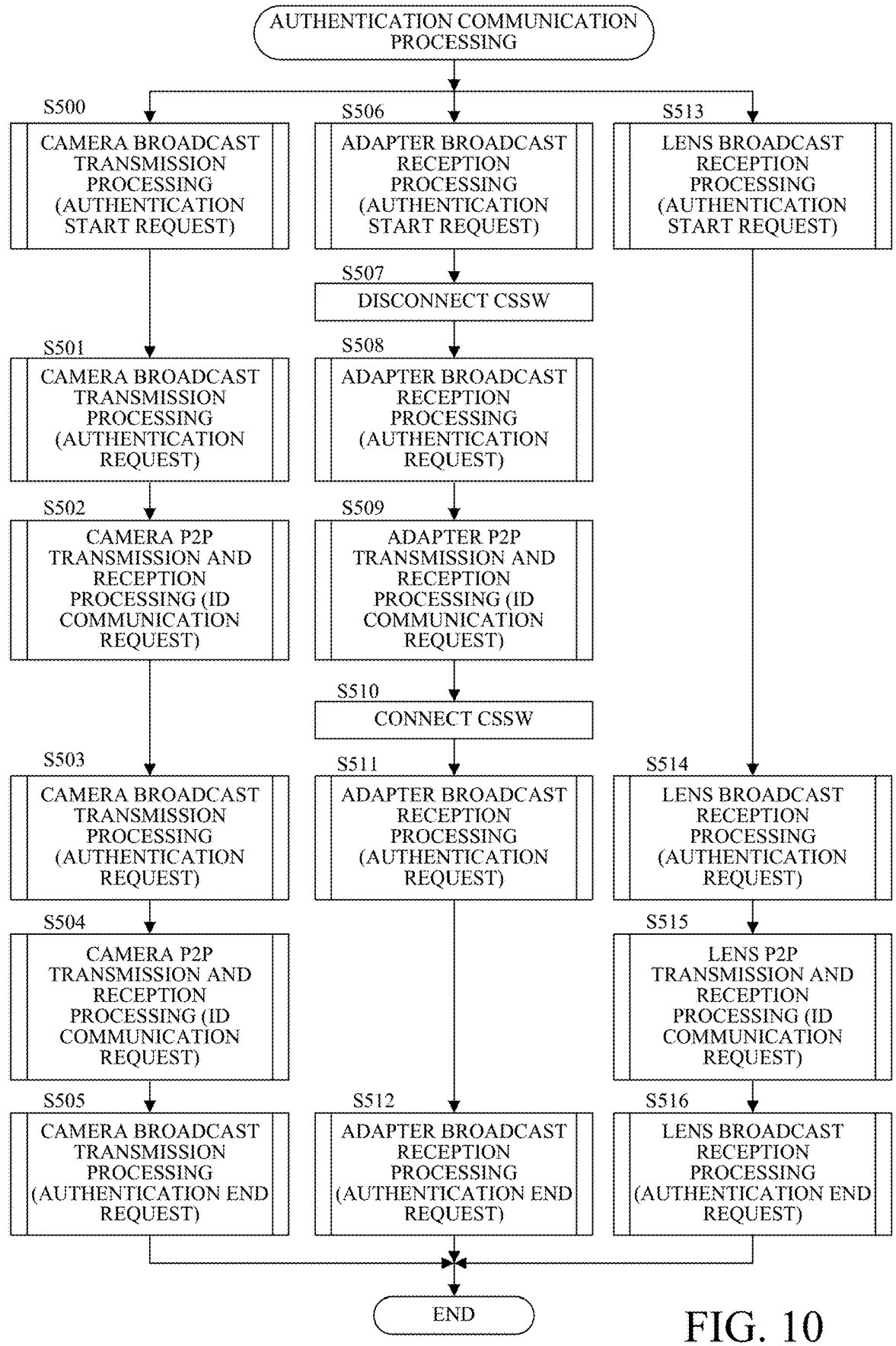
FIG. 10 is a flowchart showing authentication communication processing according to the first embodiment.
Figure 11:
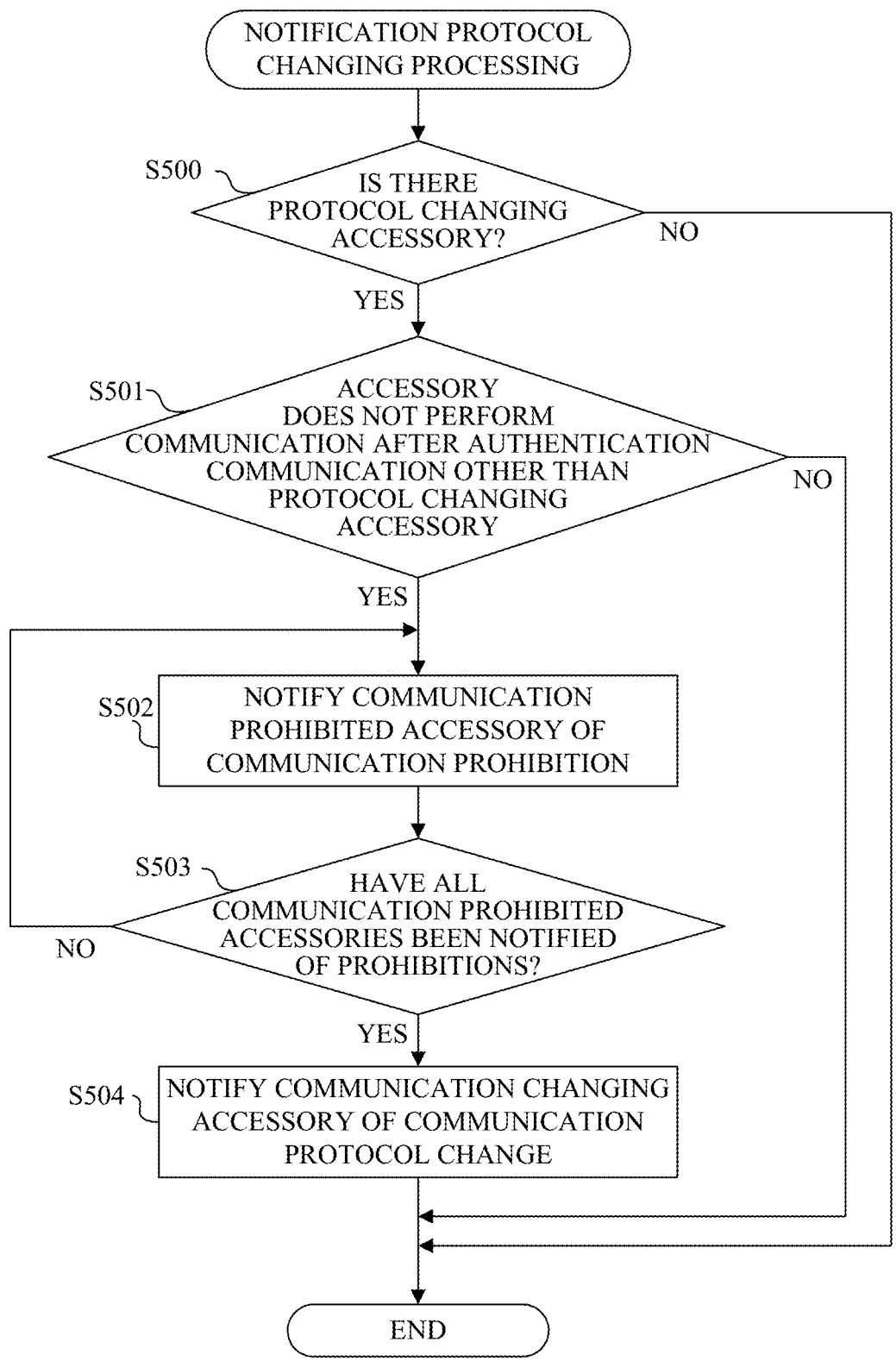
FIG. 11 is a flowchart showing communication protocol changing processing according to the first embodiment.

Referring now to FIGS. 9 and 10, a description will be given of authentication communication processing according to this embodiment. FIG. 9 illustrates signal waveforms in the authentication communication processing performed among the camera microcomputer 205, the lens microcomputer 111, and the adapter microcomputer 302.

The top of the figure illustrates data communicated by the signal line DATA, "Camera" indicates data output by the camera microcomputer 205, "Adapter" indicates data output by the adapter microcomputer 302, and "Lens" indicates data output from the microcomputer 111. "CS signal (camera)" indicates a signal output state (referred to as a CS signal state hereinafter) of the signal line CS detected by the camera microcomputer 205, and "CS output (camera)" indicates a signal output from the camera microcomputer 205 to the signal line CS. "CS signal (adapter)" indicates a CS signal state detected by the adapter microcomputer 302, and "CS output (adapter)" indicates a signal output from the adapter microcomputer 302 to the signal line CS. "CS SW" indicates the state of the CS switch 3033 controlled by the adapter microcomputer 302, and Low indicates the connection state. "CS signal (lens)" indicates a CS signal state detected by the lens microcomputer 111, and "CS output (lens)" indicates a signal output from the lens microcomputer 111 to the signal line CS.

A flowchart in FIG. 10 illustrates a flow of authentication communication processing. This authentication communication processing is performed when the power supply starts from the camera body 200 to the interchangeable lens 100 and the adapter 300 after the camera body 200 detects the connection of the interchangeable lens 100 through the lens detection switch 1123 provided in the camera body 200. At the start of the authentication communication processing, the camera microcomputer 205 transmits an authentication start request command via the signal line DATA by the broadcast communication in the step S500. In other words, the authentication start communication is performed. This processing is performed as a preprocess for the authentication communication by the camera microcomputer 205. At this time, the CS switch 3033 is set to the connected state. The processing in the broadcast communication and P2P communication performed later is as described with reference to FIGS. 7A, 7B, 8A, and 8B. As described above, the adapter microcomputer 302 and the lens microcomputer 111 output different signals (low and high) to the signal line CS between the ongoing communication with the camera microcomputer 205 (from a communication start to an end) and the communication standby in the broadcast communication and the P2P communication.

The adapter microcomputer 302 and the lens microcomputer 111 that have received the authentication start request command perform reception processing in the broadcast communication in the steps S506 and S513, respectively. If the received result is an authentication start request command, the adapter microcomputer 302 switches the CS switch 3033 to a disconnected state in the step S507. Herein, the timing of the CS switch 3033 is after the adapter microcomputer 302 stops the low output to the signal line CS (after the step S208 in FIG. 7B), but may be just before or simultaneous with stopping the low output.

Next, the camera microcomputer 205 sends an authentication request command via the communication line DATA in the step S501 when the adapter microcomputer 302 stops the low output to the signal line CS and the communication circuit is waiting for the communication. In other words, the authentication request communication is performed. In the subsequent processing, the camera microcomputer 205 performs the authentication communication. The authentication request command is slave designation data for designating as a designated slave (first accessory apparatus) the communication slave that has received it through the broadcast communication. Since the signal line CS is disconnected by the CS switch 3033 in the step S507, the low output to the signal line CS in the step S501 is not detected by the lens microcomputer 111.

On the other hand, since the communication line DATA is connected, the authentication request command has been transmitted to the lens microcomputer 111. However, the authentication request command is a command premised on the broadcast communication in which data can be received only when the signal line CS is low. Hence, the lens microcomputer 111 that has received the authentication request command while the signal line CS is high ignores this command.

The adapter microcomputer 302 receives the authentication request command via the communication line DATA by the broadcast communication in the step S508. Since the adapter microcomputer 302 that has received the authentication request command has received the authentication request command for the first time, it is the slave designation data transmitted to itself, and determines that the next P2P communication is communication addressed to itself.

Next, in the step S502, the camera microcomputer 205 transmits an ID communication request command via the communication line DATA by the P2P communication. In other words, the authentication information communication is performed. At this time, the camera microcomputer 205 does not recognize that the communication counterpart of the P2P communication is the adapter microcomputer 302. This is because it is not yet known at this point how many accessories are connected to the camera body 200. The camera microcomputer 205 only knows that any of the connected communication slaves responds to the P2P communication by designating the designated slave by the authentication request command transmitted in the step S501.

In the step S509, the adapter microcomputer 302 designated as the designated slave receives the ID communication request command by the P2P communication, and in response, sends its own ID information (authentication information) to the camera microcomputer 205 via the signal line DATA by the P2P communication. Thereafter, the adapter microcomputer 302 switches the CS switch 3033 to the connected state in the step S510. Herein, the switching timing of the CS switch 3033 is after the adapter microcomputer 302 stops the low output to the signal line CS (after the step S410 in FIG. 8B), but it may be just before or simultaneous with the stop of the low output.

The P2P communication in the steps S502 and S509 may be performed only in one reciprocation between the camera microcomputer 205 and the adapter microcomputer 302 as illustrated in FIG. 9 or may be performed in two or more reciprocations.

Furthermore, although the timing for switching the CS switch 3033 to the connected state is after the step S509 in this flowchart, it may be before the step 509 (after the reception of the authentication request command in the step S508). This is because the adapter microcomputer 302 that has received the authentication request command by the broadcast communication recognizes that it is the slave designation data to itself, and the lens microcomputer 111 that has not received the authentication request command does not recognize that it is the slave designation data to itself. Hence, even when the CS switch 3033 is switched to the connected state after the step S508, only the adapter microcomputer 302 responds to the ID communication request command in the step S509.

Next, when the adapter microcomputer 302 stops the low output to the signal line CS and the communication circuit is waiting for the communication, the camera microcomputer 205 resends the authentication request command via the communication line DATA by the broadcast communication in the step S503. Herein, since the signal line CS is connected, the adapter microcomputer 302 receives the authentication request command in the step S511, and the lens microcomputer 111 also receives it in the step S514. However, the adapter microcomputer 302 has already finished the communication (or the authentication) in response to the authentication request command and the ID communication request command, and thus ignores the authentication request command at this stage. On the other hand, this is the first reception of the authentication request command for the lens microcomputer 111, the lens microcomputer 111 interprets it as the slave designation data to itself and prepares for the P2P communication.

Thereafter, the camera microcomputer 205 transmits the ID communication request command via the communication line DATA by the P2P communication in the step S504. Herein, the camera microcomputer 205 does not recognize that the counterpart of the P2P communication is the lens microcomputer 111. This is because of the same reason as that for the adapter microcomputer 302. In the step S515, the lens microcomputer 111 transmits its ID information (authentication information) to the camera microcomputer 205 via the signal line DATA by the P2P communication in response to the ID communication request command. When confirming that the received ID information is that of the interchangeable lens 100, the camera microcomputer 205 determines that no further communication slave to be authenticated is connected. Then, in the step S505, the camera microcomputer 205 transmits the authentication end request command for ending the authentication communication processing via the signal line DATA by the broadcast communication. In other words, the authentication end communication is performed. In the steps S512 and 516, the adapter microcomputer 302 and the lens microcomputer 111 receive an authentication end request command. Thereby, the authentication communication processing ends.

Thus, in this embodiment, the camera microcomputer 205 sequentially designates the designated slave using the broadcast communication whenever the CS output state indicates the ongoing standby of the communication, and performs the authentication communication using the broadcast communication and the P2P communication. Thus, the camera microcomputer 205 sequentially acquires ID information of the adapter 300 and the interchangeable lens 100.

[Variation]

ID information as the authentication information transmitted from the adapter microcomputer 302 and the lens microcomputer 111 to the camera microcomputer 205 in response to the ID communication request command may include information of a serial number for each type of accessory apparatus (such as 00 for the interchangeable lens and 01 for the extender). Moreover, the ID information may include information to which the meaning was allocated for every bit. It may contain information of a plurality of bytes. The ID information may be information indicating the type and function of the accessory apparatus.

The above authentication communication processing has described that the camera microcomputer 205 confirms that the ID information belongs to the interchangeable lens 100 and determines the end of the authentication communication. Alternatively, the ID information may include information indicating the interchangeable lens and information for instructing the end of the authentication communication, and the camera microcomputer 205 may detect it and determine the end of the authentication communication. In addition to the ID information communication, a confirmation communication for asking the communication slave about whether or not the authentication communication can be terminated may be separately performed by the P2P communication before and after the ID communication.

The first embodiment has described the single adapter 300 connected between the camera body 200 and the interchangeable lens 100, but allows a plurality of adapters connected in series. Even when a plurality of adapters are connected, it is possible to authenticate each adapter and the interchangeable lens 100 in a short time in the same procedure as that described in the first embodiment. At this time, the plurality of adapters that simultaneously receive the authentication start request command by the broadcast communication almost simultaneously set the CS switch to the disconnected state, so that the subsequent authentication is always performed sequentially from the adapter closer to the camera body 200 one by one. Similar to the case where one adapter is connected, the interchangeable lens 100 is finally authenticated, and a series of authentication communication processing is completed.

When the adapter 300 is not connected and the interchangeable lens 100 is directly connected to the camera body 200, the authentication communication is performed for the interchangeable lens 100 without performing part of the authentication communication for the adapter 300 in the authentication communication processing illustrated in FIGS. 9 and 10.

The adapter 300 in the first embodiment may be an extender as described above, an adapter including a drivable optical element (such as a focus lens, a diaphragm, and an image stabilization lens), or an adapter including a variety of sensors (a phase difference sensor, an angular velocity).

[Communication Protocol Changing Processing]

Referring now to FIGS. 11 and 12A to 12D, a description will be given of communication protocol changing processing according to this embodiment. A specific example of changing the communication protocol will be described later. The camera microcomputer 205 starts this processing after the authentication communication ends. FIGS. 12A to 12D illustrate communications among the camera body 200, the interchangeable lens 100, and the adapter 300 after the authentication communication is completed.

In the step S500, the camera microcomputer 205 uses the authentication information acquired by the authentication communication to determine whether or not there is an accessory apparatus (first accessory apparatus: a protocol changing accessory hereinafter) that is a target of a change of the communication protocol. The protocol changing accessory may be the interchangeable lens 100 or the adapter 300. FIGS. 12A to 12D illustrate the adapter 300 serving as a protocol changing accessory. If there is the protocol changing accessory, the camera microcomputer 205 proceeds to the step S501; otherwise, the camera microcomputer 205 ends this processing.

In the step S501, the camera microcomputer 205 uses the authentication information to determine whether or not one or more accessory apparatuses other than the protocol changing accessory (second accessory apparatus: referred to as a communication prohibited accessory hereinafter) perform the communication after the authentication communication. In FIGS. 12A to 12D, the interchangeable lens 100 is a communication prohibited accessory. The camera microcomputer 205 proceeds to the step S502 when the communication prohibited accessory does not perform the communication after the authentication communication, and ends the processing in the communication.

In the step S502, the camera microcomputer 205 notifies the communication prohibited accessory of the communication prohibition by the P2P communication via the communication line DATA, as illustrated in FIG. 12A. When the communication prohibition is notified by the P2P communication, only some of the accessories can be notified of the communication prohibition.

The camera microcomputer 205 that has notified the communication prohibition proceeds to the step S503. On the other hand, the communication prohibited accessory that has been notified of the communication prohibition stops the subsequent communications between the camera microcomputer 205 and the protocol changing accessory.

In the step S503, the camera microcomputer 205 determines whether or not the communication prohibition has been notified to all communication prohibited accessories. The camera microcomputer 205 proceeds to the step S504 when notifying the communication prohibition to all the communication prohibited accessories, and proceeds to the step S502 when there is a communication prohibited accessory that has not been notified of the communication prohibition.

In the step S504, the camera microcomputer 205 specifies the protocol changing accessory by the P2P communication or the broadcast communication via the communication line DATA, and notifies the protocol changing accessory of the change of the communication protocol. The protocol changing accessory is notified of the protocol change after all the communication prohibition notifications to the communication prohibited accessories are completed, via the P2P communication or the broadcast communication. Then, after the notice, the camera microcomputer 205 and the protocol changing accessory change the communication protocol and end the processing.

Thus, by prohibiting the communication of the communication prohibited accessory other than the protocol changing accessory, the malfunction (erroneous communication) after the communication protocol is changed can be prevented. The protocol change notice to the protocol changing accessory can provide the communication suitable for the protocol changing accessory. This facilitates the high-speed communication.

[Change of Communication Protocol]

Next follows a description of a specific example of the change of the communication protocol according to this embodiment. After the notification of the change of the communication protocol from the camera body 200 to the protocol changing accessory, there is no need to specify the P2P communication counterpart by the one-to-many communication between the camera body 200 and a plurality of accessory apparatuses. When it is no longer necessary to specify a P2P communication counterpart by the one-to-many communication, the camera body 200 (camera microcomputer 205) can perform the P2P communication without performing the broadcast communication with the protocol changing accessory.

Accordingly, after notifying the protocol changing accessory of the change of the communication protocol, the camera microcomputer 205 continuously performs the P2P communication between the camera body 200 and the protocol changing accessory without any extra broadcast communications as shown in FIG. 12B. The P2P communication includes, for example, a communication of an adapter data transmission request command from the camera body 200 and a communication of the corresponding adapter data from the adapter 300. Thereby, the communication between the camera body 200 and the protocol changing accessory can be expedited. The communication protocol changing notification in this case is to notify that subsequent communications are to be performed by the P2P communication (or that they may be to be performed by the broadcast communication or the P2P communication).

When the one-to-many communication becomes no longer necessary, the clock rate in the communication between the camera body 200 and the protocol changing accessory can be changed to the highest clock rate corresponding to them. Accordingly, the camera body 200 notifies, as the communication protocol changing notification, the protocol changing accessory that the clock rate of at least one of the broadcast communication and the P2P communication is to be changed (increased). Then, the camera body 200 and the protocol changing accessory perform the communication after the clock rate is changed. Thereby, the communication between the camera body 200 and the protocol changing accessory can be expedited.

If no one-to-many communication is performed, the camera body 200 does not need to control the communication using the signal line CS. Therefore, the signal line CS may be used as a communication line (second data communication channel) DATA2 that can perform the data communication like the signal line DATA. At this time, the data transmission direction on the communication line DATA2 may be made switchable. As illustrated in FIG. 12C, when the signal line CS is set to a communication line for the data communication in the direction opposite to the signal line DATA, the camera body 200 and the protocol changing accessory can communicate with each other. On the other hand, if the signal line CS is set to a communication line that communicates in the same direction as the signal line DATA as illustrated in FIG. 12D, data is transmitted from one of the camera body 200 and the protocol changing accessory to the other at a double communication speed. The communication protocol changing notification in this case is to notify the change of the signal line CS to the signal line DATA2 and the data transmission direction of the signal line DATA2.

In this case, the signal line CS may be changed from an output circuit with low responsiveness for performing the one-to-many communication to an output circuit with good (high) responsiveness. Thereby, data can be transmitted and received through two signal lines, and a higher communication becomes available. An example of an output circuit having good responsiveness is, but not limited to, a CMOS output circuit.

The camera microcomputer 205 may perform only one of the plurality of communication protocol changes described above, or may perform two or more (or all) of them. The communication protocol to be changed may be specified by the camera body 200 or the protocol changing accessory during the communication PROTOCOL CHANGING NOTIFICATION.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

This embodiment can expedite the communication between the imaging apparatus and a specific accessory apparatus (first accessory apparatus) where a plurality of accessory apparatuses are connected to the imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072129, filed on Apr. 4, 2019, which is hereby incorporated by reference herein in its entirety.

What is claimed is:

1. An imaging apparatus usable while connected to a plurality of accessory apparatuses, the imaging apparatus comprising:
   a camera communicator connected to a signal communication channel used to transmit signals between the imaging apparatus and the plurality of accessory apparatuses and a data communication channel used for a data communication between the imaging apparatus and the plurality of accessory apparatuses; and
   a camera controller configured to perform a signal communication with the plurality of accessory apparatuses using the signal communication channel, and a first communication that is a data communication with the plurality of accessory apparatuses and a second communication that is a data communication with a first accessory apparatus among the plurality of accessory apparatuses, using the data communication channel,
   wherein the camera controller notifies a second accessory apparatus other than the first accessory apparatus of a communication prohibition by the second communication, and
   wherein the camera controller then notifies a change of a clock rate of at least one of the first communication and the second communication via the second communication to change the clock rate.

2. The imaging apparatus according to claim 1, wherein each of the plurality of accessory apparatuses has authentication information, and
   wherein the camera controller performs an authentication communication for sequentially acquiring the authentication information of the plurality of accessory apparatuses using the first communication and the second communication before the communication prohibition is notified.

3. The imaging apparatus according to claim 1, wherein an accessory apparatus having an optical element is connected as the first accessory apparatus.

4. An accessory apparatus among a plurality of accessory apparatuses that are connectable to an imaging apparatus, the accessory apparatus comprising:
   an accessory communicator connected to a signal communication channel used to communicate a signal between the imaging apparatus and the plurality of accessory apparatuses; and to a data communication channel used for a data communication between the accessory apparatus and the imaging apparatus; and
   an accessory controller configured to perform a signal communication with the imaging apparatus using the signal communication channel and to perform a data communication with the imaging apparatus using the data communication channel,
   wherein in a case where (i) the plurality of accessory apparatuses are connected to the imaging apparatus, (ii) the imaging apparatus is capable of performing, as the data communication, a first communication with the plurality of accessory apparatuses and a second communication with the accessory apparatus among the plurality of accessory apparatuses, and (iii) another accessory apparatus among the plurality of accessory apparatuses other than the accessory apparatus is notified by the imaging apparatus of a communication prohibition by the second communication, the accessory controller is configured to receive, from the imaging apparatus, notification of a change of a clock rate of at least one of the first communication and the second communication and to change the clock rate in response to the notification.

5. The accessory apparatus according to claim 4, wherein each of the plurality of accessory apparatuses has different authentication information, and
   wherein the accessory controller performs an authentication communication for transmitting the authentication information to the imaging apparatus using the first communication and the second communication before the communication prohibition is notified.

6. The accessory apparatus according to claim 4, further comprising an optical element.

7. A non-transitory computer-readable storage medium storing a program that causes a computer to execute a control method of an imaging apparatus usable while connected to a plurality of accessory apparatuses, connected to a signal communication channel used to transmit signals between the imaging apparatus and the plurality of accessory apparatuses and a data communication channel used for a data communication between the imaging apparatus and the plurality of accessory apparatuses, the imaging apparatus, and configured to perform a signal communication with the plurality of accessory apparatuses using the signal communication channel, and a first communication that is a data communication with the plurality of accessory apparatuses and a second communication that is a data communication with a first accessory apparatus among the plurality of accessory apparatuses, using the data communication channel,
   wherein the control method includes the steps of:
   notifying a second accessory apparatus other than the first accessory apparatus of a communication prohibition by the second communication; and
   then notifying a change of a clock rate of at least one of the first communication and the second communication via the second communication to change the clock rate.

8. A non-transitory computer-readable storage medium storing a program that causes a computer to execute a control method of an accessory apparatus among a plurality of accessory apparatuses that are connectable to an imaging apparatus, the accessory apparatus being connected to a signal communication channel used to communicate a signal between the imaging apparatus and the plurality of accessory apparatuses and to a data communication channel used for a data communication between the accessory apparatus and the imaging apparatus, the accessory apparatus being configured to perform a signal communication with the imaging apparatus using the signal communication channel and to perform a data communication with the imaging apparatus using the data communication channel, the control method comprising:

in a case where (i) the plurality of accessory apparatuses are connected to the imaging apparatus, (ii) the imaging apparatus is capable of performing, as the data communication, a first communication with the plurality of accessory apparatuses and a second communication with the accessory apparatus among the plurality of accessory apparatuses, and (iii) another accessory apparatus among the plurality of accessory apparatuses other than the accessory apparatus is notified by the imaging apparatus of a communication prohibition by the second communication, receiving, from the imaging apparatus, notification of a change of a clock rate of at least one of the first communication and the second communication, and changing the clock rate in response to the notification.

* * * * *